United States Patent
Gardner

(10) Patent No.: US 7,290,176 B2
(45) Date of Patent: Oct. 30, 2007

(54) METHOD AND SYSTEM FOR GENERATING STACKED REGISTER DUMPS FROM BACKING-STORE MEMORY

(75) Inventor: Robert D. Gardner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 618 days.

(21) Appl. No.: 10/909,801

(22) Filed: Jul. 31, 2004

(65) Prior Publication Data

US 2006/0026579 A1    Feb. 2, 2006

(51) Int. Cl.
*G06F 11/00* (2006.01)

(52) U.S. Cl. .......................... 714/38; 711/132
(58) Field of Classification Search ................ 714/38, 714/39, 7, 8; 711/132, 170
See application file for complete search history.

(56) References Cited

U.S. PATENT DOCUMENTS

| | | | |
|---|---|---|---|
| 4,622,013 A * | 11/1986 | Cerchio | 434/118 |
| 6,161,219 A * | 12/2000 | Ramkumar et al. | 717/130 |
| 6,263,401 B1 * | 7/2001 | Ross et al. | 711/109 |
| 6,314,513 B1 * | 11/2001 | Ross et al. | 712/228 |
| 6,367,005 B1 * | 4/2002 | Zahir et al. | 712/228 |
| 6,550,058 B1 * | 4/2003 | Wynn | 717/158 |
| 6,993,754 B2 * | 1/2006 | Freudenberger et al. | 717/153 |
| 7,051,238 B2 * | 5/2006 | Gardner et al. | 714/38 |
| 7,178,132 B2 * | 2/2007 | Pierce | 717/127 |
| 2004/0083460 A1 * | 4/2004 | Pierce | 717/131 |

* cited by examiner

*Primary Examiner*—Dieu-Minh Le
(74) *Attorney, Agent, or Firm*—Richard P. Lange

(57) ABSTRACT

In various embodiments of the present invention, debugging and program-behavior-analysis software can reconstruct register-based processor states for nested routine calls from the backing-store memory employed by a modern processor, and by processors of similar architectures, to automatically spill and restore register values via a register stack engine. Sufficient information resides in the backing-store memory to reconstruct the stack frames for all nested routines. However, reconstructing the stack frames from the backing-store memory depends on identifying stored register vales in the backing-store memory containing saved values of the previous-frame-marker application register. Various embodiments of the present invention employ a set of heuristic tests to evaluate stored values in the backing-store memory in order to identify those values corresponding to the stored contents of the previous-frame-marker application register.

14 Claims, 30 Drawing Sheets

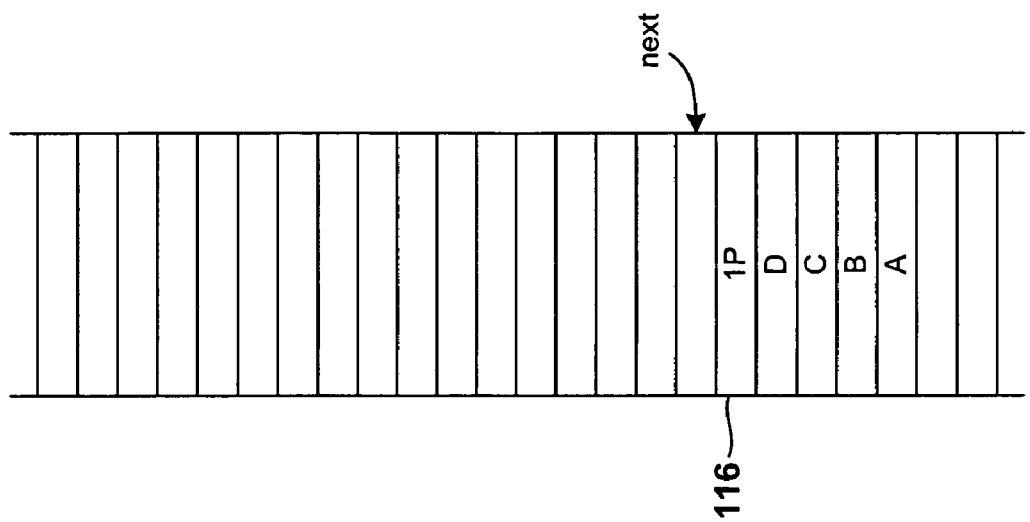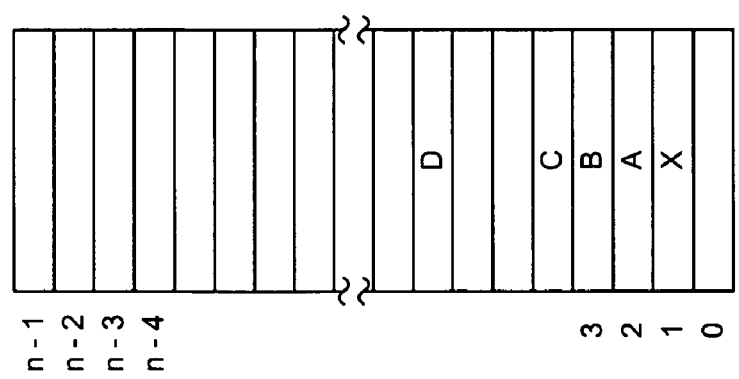
Figure 1C

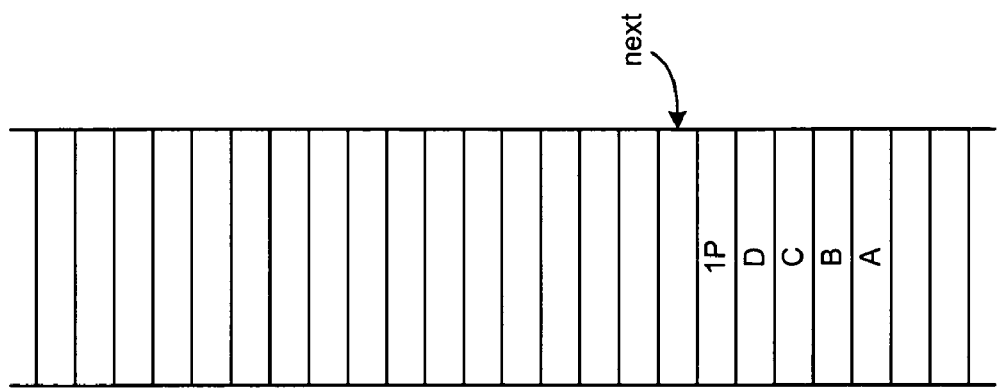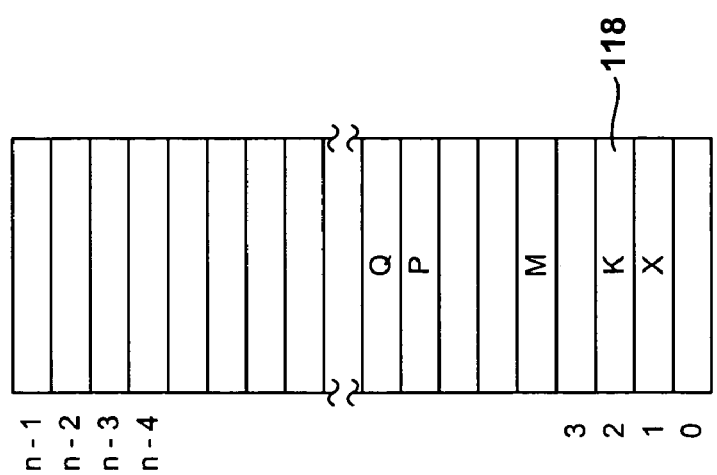
Figure 1D

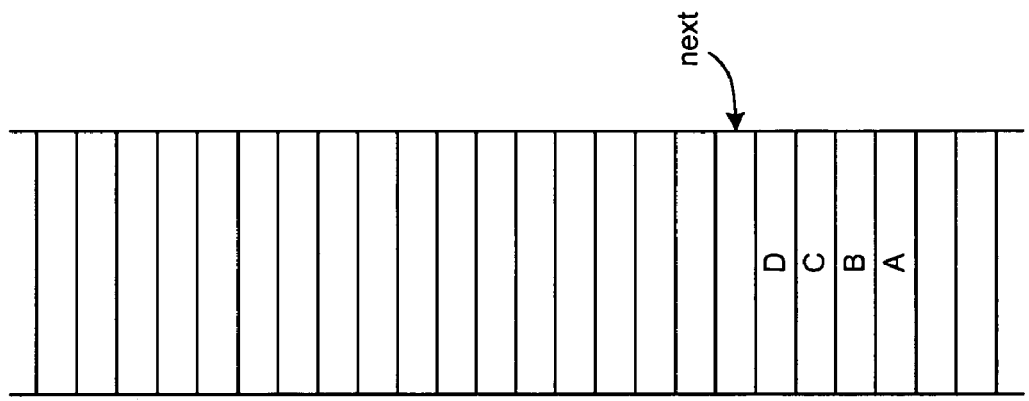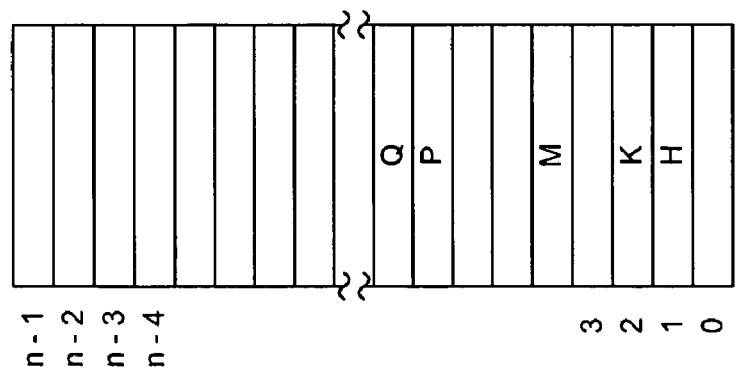
Figure 1E

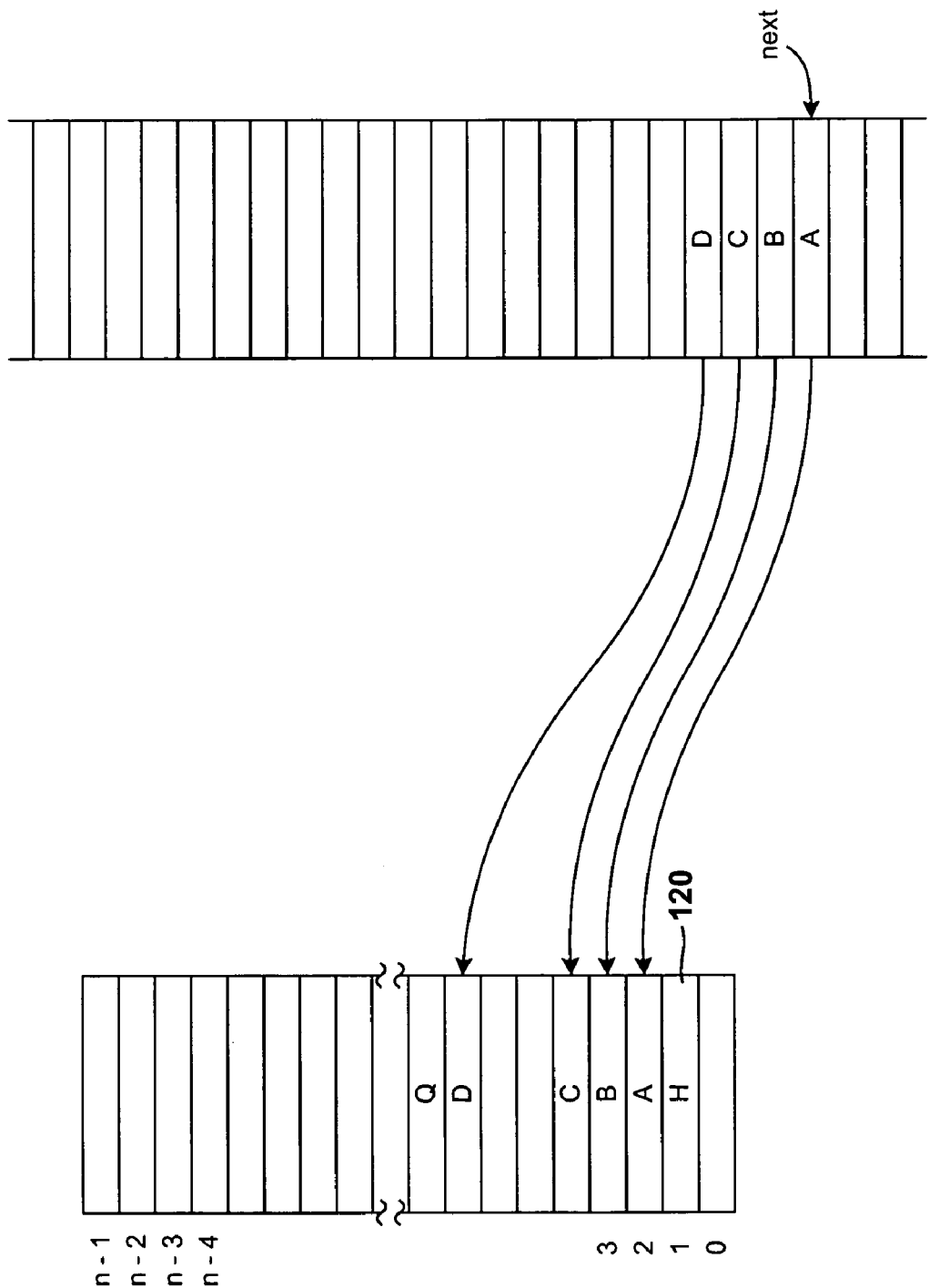

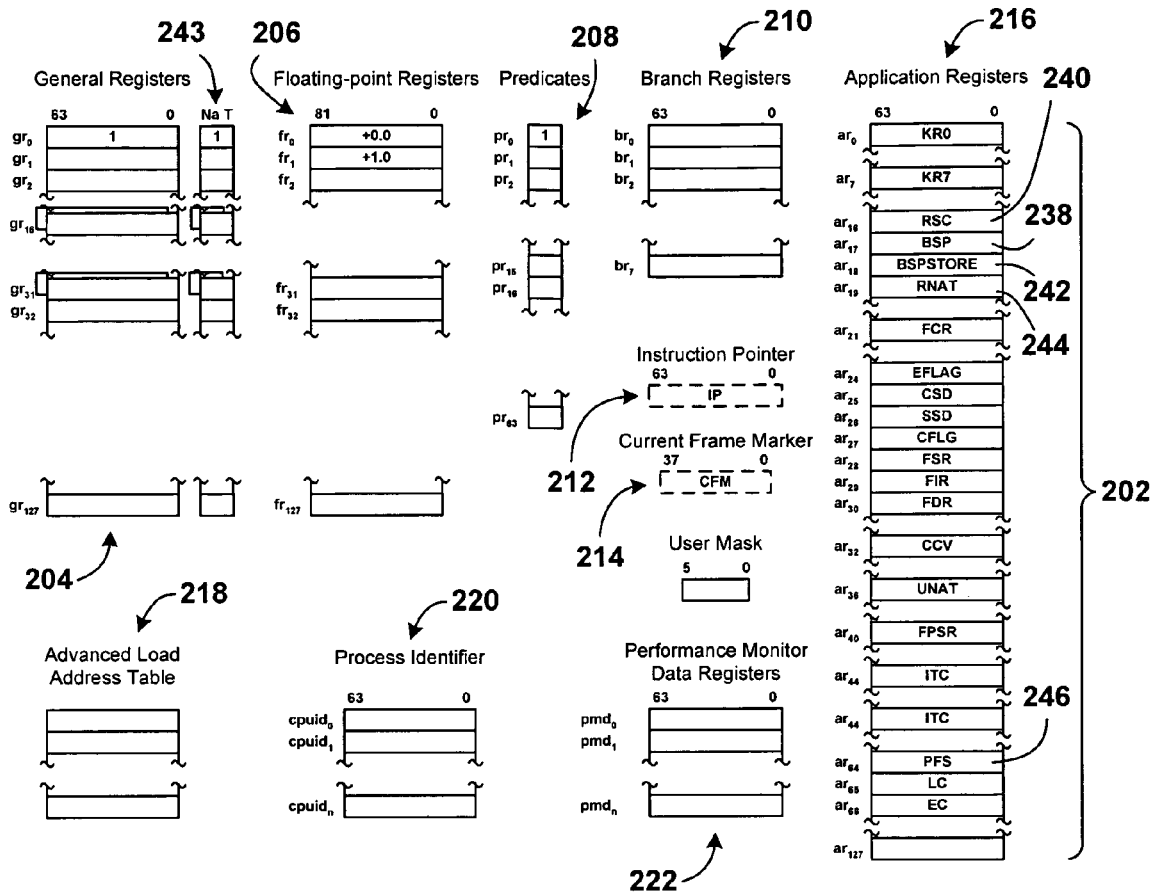
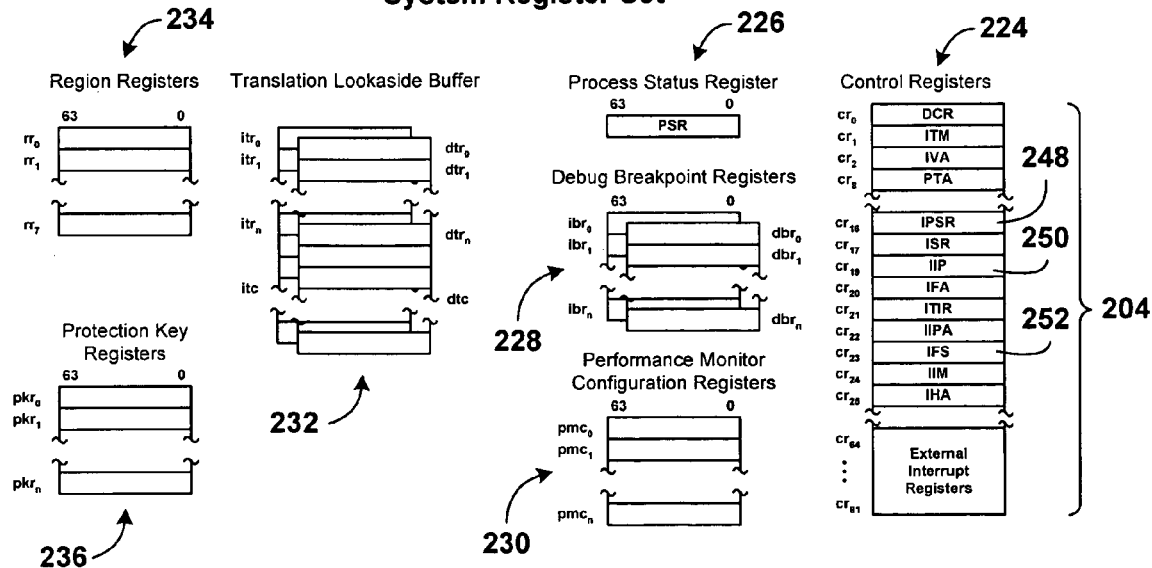
Figure 2

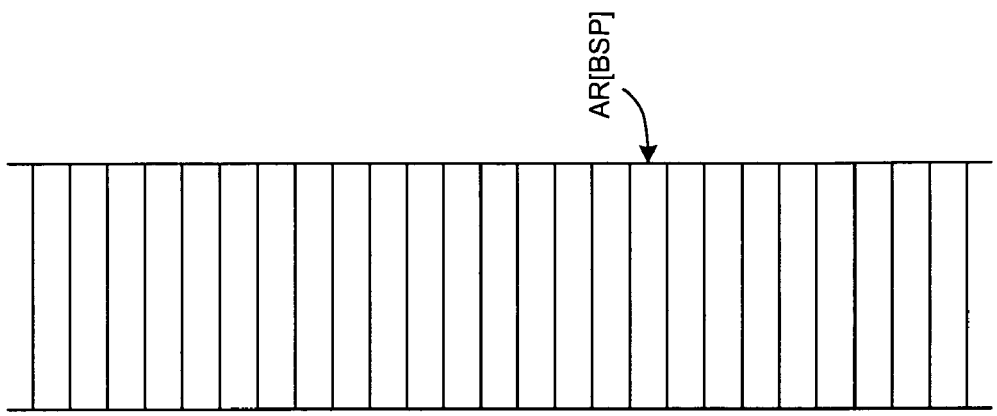
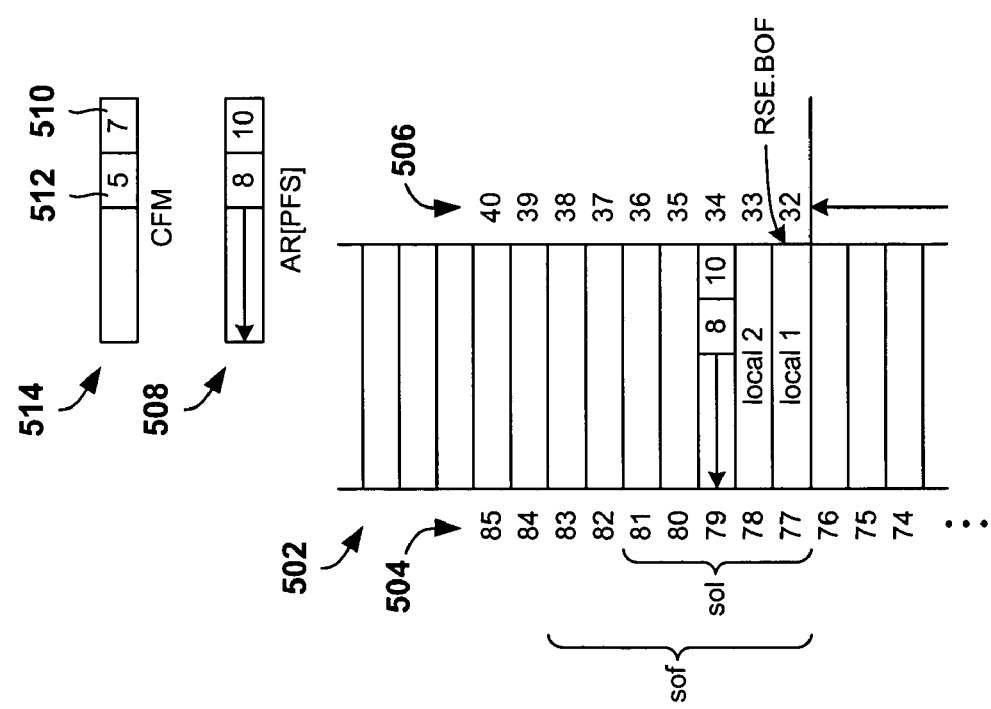
Figure 5A

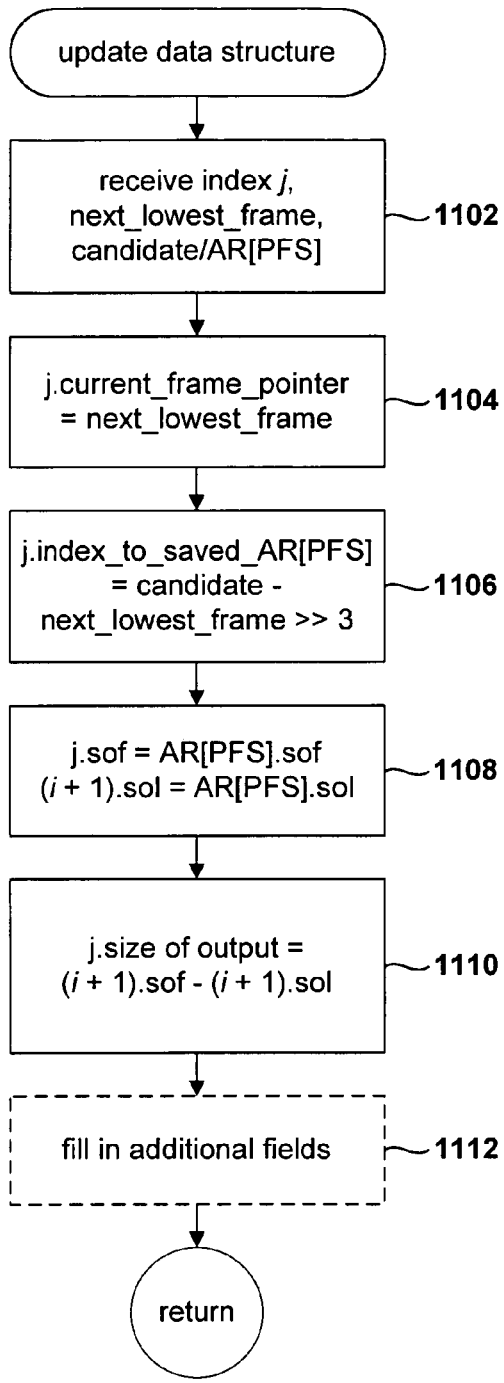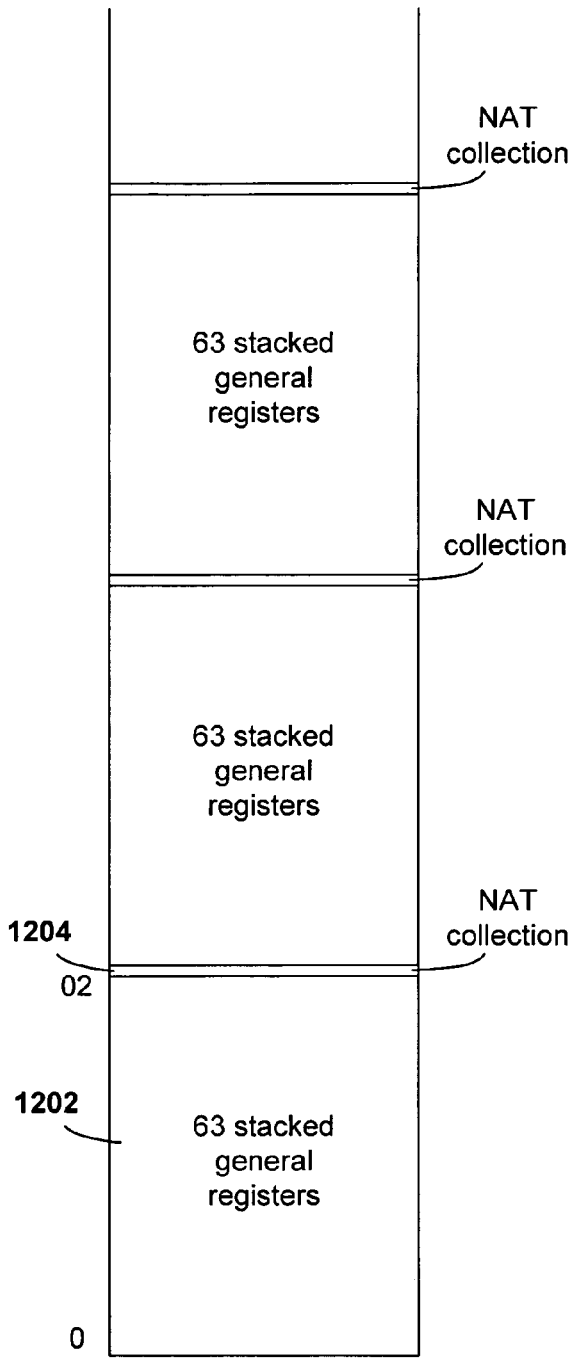
Figure 11  Figure 12

METHOD AND SYSTEM FOR GENERATING STACKED REGISTER DUMPS FROM BACKING-STORE MEMORY

TECHNICAL FIELD

The present invention is related to debugging and program-behavior analysis support for computer systems and, in particular, to a method for obtaining nested stack frames containing stacked register values from the backing store employed by a modern processor for automatic storage and retrieval of register values.

BACKGROUND OF THE INVENTION

In modern programming, it is common for routine calls to be deeply nested. The processor state, as at least partially reflected by the values stored in a number of different registers, is generally saved on a system stack by a calling routine, so that a called routine can freely use register resources for the called routine's computations, and so that the processor state of the calling routine can be restored when the called routine completes. Deeply nested routine calls are reflected in a corresponding large number of stack frames stacked in a system stack. When problems arise, and processes are aborted or debuggers invoked, the values of stacked registers are crucial for tracing back through nested routine calls in order to determine the sequence of events leading to the error. Currently, compliers and assemblers separately generate copious amounts of debug information that is stored in memory during execution of processes in order to facilitate recovery of the register value states of nested routine calls in the event of an error condition or during breakpoint—facilitated analysis or program execution behavior. This stored information is needed both to interpret any values recoverable from a system stack and to replace information lost as a result of memory corruption or loss resulting from an error condition.

The approach of storing additional information in memory to facilitate recovery of stacked register values has several disadvantages. First, this method requires that source code is compiled, or assembly code assembled, with correct options to generate the additional debug information stored in memory. Unfortunately, it is frequently the case that the correct options have not been selected, and yet an important error needs to be debugged without the ability to recompile the code with the appropriate debugging options. A second disadvantage is that the loader employed to link compiled programs into executables must allocate additional space in memory to hold the debug information when the debug options are enabled during compilation and assembly. It can be the case that allocation of additional memory sufficiently changes the computing environment to mask error conditions that would arise when code compiled without debug options is executed. However, in many cases, the debug options cannot be used for compiling production systems, because of the inefficiencies of added instructions and the additional needed memory space. An additional disadvantage is that, even when debugging options are desired, it may be inefficient or impossible for the linker to allocate the additional memory space needed for debugging, depending on the constraints of the computer system and the execution environment. For these reasons, designers, developers, manufacturers, and users of programming tools, including compilers, assemblers, and debugging environments have recognized the need for alternative methods for recovering stacked register values for nested routines in order to facilitate debugging and system analysis.

SUMMARY OF THE INVENTION

In various embodiments of the present invention, debugging and program-behavior-analysis software can reconstruct register-based processor states for nested routine calls from the backing-store memory employed by a modern processor, and by processors of similar architectures, to automatically spill and restore register values via a register stack engine. Sufficient information resides in the backing-store memory to reconstruct the stack frames for all nested routines. However, reconstructing the stack frames from the backing-store memory depends on identifying stored register vales in the backing-store memory containing saved values of the previous-frame-marker application register. Various embodiments of the present invention employ a set of heuristic tests to evaluate stored values in the backing-store memory in order to identify those values corresponding to the stored contents of the previous-frame-marker application register.

BRIEF DESCRIPTION OF THE DRAWINGS

FIGS. 1A-F illustrate a generalized method for saving state on a system stack by a first routine during a call by the first routine to a second routine.

FIG. 2 shows the registers provided in the IA-64 architecture.

FIGS. 5A-G illustrate allocation and de-allocation of a register stack frame associated with a routine call.

FIG. 11 is a control-flow diagram for a routine "update data structure" that stores values into a data record of the type illustrated in FIG. 9 for stacking onto the data structure shown in FIG. 10 that represents one embodiment of the present invention.

FIG. 12 illustrates the general pattern for storing stacked general register values and NAT collection values within the backing-store memory of an IA-64 based computer system.

DETAILED DESCRIPTION OF THE INVENTION

Various embodiments of the present invention employ techniques to interpret stored register values within the backing-store memory allocated for, and used by, the register stack engine of Intel IA-64 processors, and similar processors with different architectures, for automatically spilling and reloading register values to facilitate routine calls. Use of the backing-store memory obviates the need for allocating special memory, and devoting compiler and assembler support, for storing debug information during execution of programs to facilitate reconstruction of the register-based processor states for nested routines. Moreover, the register-based processor states for nested routines can be recovered by embodiments of the present invention whether or not the routines and programs are compiled with various debugging options that store additional debugging information at run time.

Many embodiments of the present invention concern the Intel IA-64, or IPF, processor architecture. To facilitate detailed understanding of embodiments of the present invention, a more detailed description of the IA-64 architecture, as related to automatic register spill and reload, is provided in a first subsection, below. Following the first subsection, a second subsection includes a detailed description of various embodiments of the present invention.

Additional Background Information Related To The IA-64 Architecture

Figure 1A:
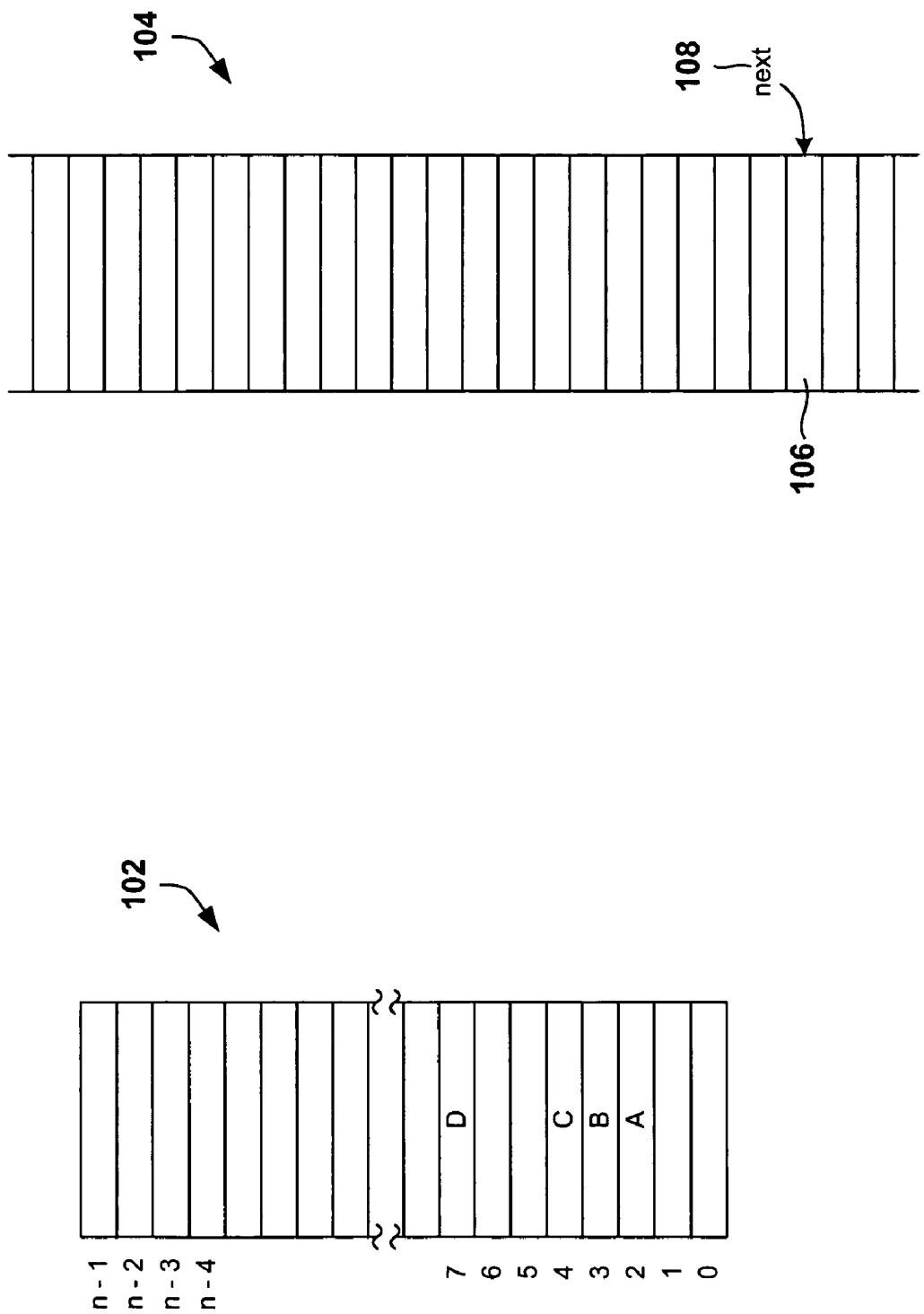

FIGS. 1A-F illustrate a generalized method for saving state on a system stack by a first routine during a call by the first routine to a second routine. FIG. 1A uses the same illustration conventions as FIGS. 1B-F. In FIG. 1A, n general registers 102 available for use by a process are shown in a column starting with register $r_0$ and ending with register $r_{n-1}$. FIG. 1A also shows a series of sequentially addressed words 104 in the memory that serve as a system stack in which the values of registers are stored and retrieved by executing processes. The next available memory word for pushing a register value onto the stack is marked, in FIG. 1A, and in subsequent figures, by a next pointer 108. In general, one of the general purpose registers $r_0$ through $r_{n-1}$ is designated, by convention, to store a pointer to the next available memory location into which a register value may be pushed. In other words, a selected register is employed to store the next pointer. In FIG. 1A, a number of symbolic values A, B, C, D are shown stored in registers r2, r3, r4, and r7, respectively. These values have been stored in the registers by the currently executing procedure. The remaining registers may also contain values stored by the currently executing procedure or by previously executing procedures, but these values are temporary, or scratch, values no longer needed by the currently executing procedure or by previously executing procedures.

In the relatively general and simple architecture employed in FIGS. 1A-F, there is one, single set of general purpose registers that define the current state of the processor and that are time multiplexed on behalf of multiple, concurrently running processes and shared by various routines that are invoked and execute within the context of a single process or thread. Therefore, when a currently executing routine invokes a next routine via a routine call, any values currently stored in registers that will be needed by the currently executing routine following return of the called routine need to be saved in memory, so that the called routine can freely use the set of general registers during the called routine's execution. Registers are essentially a very small, but extremely fast set of memory resources within the processor, used for locally storing values generated and manipulated by execution of instructions on the processor. In addition, certain special registers hold values that control and define various aspects of processor behavior. For example, in most computer architectures, one special register holds the memory address of the next instruction to be fetched and executed by the processor, commonly referred to as the instruction pointer ("IP") register, and another register contains numerous bits and bit fields that define various aspects of processor behavior, commonly referred to as the processor status register ("PSR").

The exact method by which registers are saved and restored when one routine invokes another routine, and when an invoked routine completes execution and returns control to the invoking routine, are somewhat arbitrary, and are encoded in compilers used to compile high-level programs into machine code. In some systems, for example, it is the responsibility of the calling routine to save register values prior to invoking another routine and to restore register values following completion of the called routine. In other systems, it is the called routine's responsibility to store and restore register values. In yet other systems, the calling routine stores the register values, and the register values are restored as a part of the return of control from the called routine to the calling routine.

FIGS. 1B-F illustrate one of numerous possible schemes for storing register values upon routine invocation and restoring register values upon invoked routine termination. In the example illustrated in FIGS. 1A-F, the calling routine stores any register values that the calling routine needs to preserve for use following completion of a routine call in a system-stack data structure in memory. To store a register value on the stack, an operation commonly referred to as pushing the value onto the stack, the calling routine moves the contents of the register to the memory location referenced by the next pointer, and increments the contents of the next pointer to point to either the next-largest memory location or the next-smallest memory location, depending on whether the stack grows in the direction of higher memory addresses or in the direction of lower memory addresses. In general, the general purpose registers have a fixed length, in bits, equal to the size of the natural word employed in the computer architecture. In other words, each register stores a natural word, and each memory location also stores a natural word. In many existing computer systems, the natural words size is 32 bits, and memory is byte addressable, so that the numerical values stored in the next pointer increase by four with each push and pop operation. In newer architectures, a 64-bit word size is used, and memory may be byte, 16-bit short word, 32-bit word, or 64-bit long word addressable. Values are removed from the system stack, an operation commonly referred to as popping a value from the stack, by moving the contents of the memory location immediately preceding or following the memory location currently referenced by the next pointer, depending on whether the stack grows towards higher memory addresses or towards lower memory addresses, into a register and decreasing or increasing the value in the next pointer by an amount needed to reference the immediately preceding or immediately following memory location, again depending on whether the stack grows towards higher memory addresses or towards lower memory addresses.

Figure 1B:
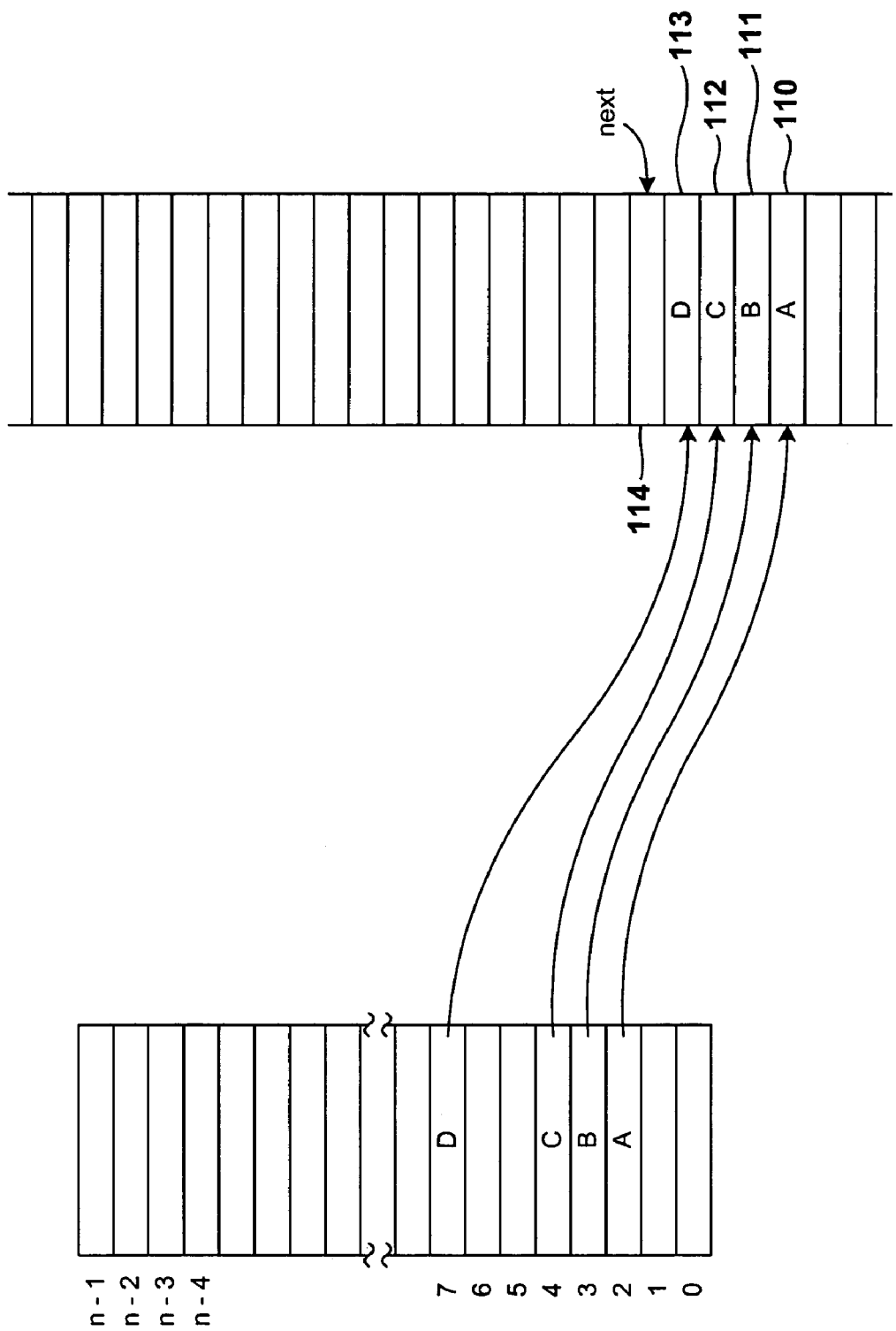

As shown in FIG. 1B, the currently executing routine prepares to call a different routine by saving values stored in registers $r_2$, $r_3$, $r_4$, and $r_7$ into the system stack via four push operations. Execution of the four push operations results in the values stored in registers $r_2$, $r_3$, $r_4$, and $r_7$ placed into memory locations 110-113, respectively. The next pointer has been correspondingly incremented to now point to the next free memory location 114. It is important to note that, in the convention illustrated in FIGS. 1B-F, it is the calling routine's responsibility to store any values maintained in registers that are needed subsequent to a routine call into the system stack, and to subsequently restore those values following the routine call. Next, as shown in FIG. 1C, the calling routine pushes the contents of the IP register onto the stack 116. Finally, control is transferred to the called routine, which begins executing and storing values into the general purpose registers, as illustrated in FIG. 1D. For example, the called routine has overwritten the value "A," previously stored in register $r_2$, with the symbolic value "K" 118. In the case that the calling routine furnishes arguments, or parameters, to the called routine, those parameters may be placed into a particular set of registers that, by convention, are assumed by the called routine to contain the parameters or arguments. Thus, for example, the called routine, currently executing in the state shown in FIG. 1D, may access the symbolic value "X" stored in register $r_1$ by the calling routine prior to invocation of the called routine.

When the called routine terminates, the processor needs to be directed to return control to the instruction in the calling routine following the branch instruction or call instruction that invoked the called routine. This is accomplished, as shown in FIG. 1E, by popping the value of the IP register from the system stack and placing the saved IP value into the IP register. Control is then effectively transferred back to the calling routine which, as shown in FIG. 1F, can now pop the saved values of registers $r_2$, $r_3$, $r_4$, and $r_7$ from the system stack in order to restore the values of registers $r_2$, $r_3$, $r_4$, and $r_7$ prior to proceeding with subsequent computation. Note that the called routine can return values to the calling routine via one or more general purpose registers. For example, the calling routine has overwritten the symbolic value "X" stored into register $r_1$ by the calling routine with the symbolic value "H" 120, which is now accessible by the calling routine.

A system stack data structure is employed because routine calls may be deeply nested, with the machine state, as represented by values stored in registers, stored in successive blocks, or frames, on the system stack, with stacked frames retrieved in opposite order from the order in which they are stacked. The maximum nesting level for routine calls is bounded only by the amount of memory devoted to the system stack, and, of course, by the size of the stack frames needed for storing the state of each routine.

In modern computing, execution of even moderately complex programs can lead to very deep nesting of routine calls and stacking of very large numbers of stack frames onto the system stack. Each register store and restore operation costs valuable processor cycles, decreasing the processor bandwidth available for other calculations. Therefore, much effort has been devoted in program-language design and compiler design to efficiently using the system stack for saving register state during routine calls and during transfer of control from terminating called routines back to calling routines.

In the relatively recent Intel IA-64 processor architecture, also referred to as IPF and Itanium, a significant amount of architectural support is devoted to facilitating register store and restore operations during routine calls and transfer of control from completed routines back to calling routines This architectural support is next described.

FIG. 2 shows the registers provided in the IA-64 architecture. The registers are partitioned into an application register set 202 and a system register set 204. In general, application registers are accessible at any privilege level, while system registers are accessible only when the processor is currently at privilege level 0, the highest privilege level of the four privilege levels 0, 1, 2, and 3 provided by the IA-64 architecture. In general, privilege level 0 is intended for execution of operating-system kernels, and privilege level 3 is intended for execution of application programs. The registers provided by the IA-64 architecture include a set of 128 64-bit general purpose registers 204, a set of 128 82-bit floating point registers 206, a set of 64 predicate registers 208, a set of 64 branch registers 210, an IP register 212, a current frame marker ("CFM") register 214, and a variety of special purpose registers including application registers ("AR") $AR_0$ through $AR_{127}$ 216, advance load address table registers 218, process-identify registers 220, and performance monitor data registers 222. The system registers, which are accessible only by processes or routines running at privilege level 0, include a set of control registers ("CR") 224, ranging from $CR_0$ to $CR_{81}$, a PSR register 226, break point registers 228, performance monitor configuration registers 230, a translation lookaside buffer 232, region registers 234, and protection key registers 236. Note that particular AR registers and CR registers have acronyms that reflect their use. For example, AR register $AR_{17}$ 238, the backing-store-pointer register, is associated with the acronym BSP, and this register may be alternatively specified as AR[BSP]. In many of the registers, single bits or groups of bits comprise fields containing values with special meanings. For example, the two least significant bits within register AR[RSC] 240 together compose a mode field which controls how aggressively registers are saved and restored by the processor. These two bits can be notationally specified as "AR[RSC].mode."

Each general register in the set of 128 of general registers 204 is associated with a single NaT bit stored in 128 single-bit NaT registers 242. The acronym "NaT" stands for "not a thing," and it is used to facilitate speculative loads, in which the processor loads a register from memory prior to knowing, for sure, whether the execution branch, including the load instruction, will be executed, or loading a value from memory despite a preceding, as-yet-not-executed store instruction, without knowing whether or not the store instruction overwrites the memory value. The bulk of the general registers, $GR_{31}$ through $GR_{127}$, are automatically stored into, and restored from, memory by the IA-64 register stack engine, described below. Another group of general registers, $GR_{16}$ through $GR_{31}$, are banked, so that, on an interruption, the interrupt handler may immediately acquire a different set of general purpose registers $GR_{16}$ through $GR_{31}$ that can be used without overwriting values stored in the normally resident bank of general purpose registers $GR_{16}$ through $GR_{31}$ used by application-level and lower-priority programs. The first 16 general purpose registers $GR_0$ through $GR_{15}$ are neither banked nor automatically stored and restored, and several have special purposes and behaviors.

In the following discussion of the register stack engine and IA-64 architectural support for automated storing of register values into memory and restoring register values from memory, a number of the registers shown in FIG. 2 are described in greater detail. Registers related to this subsequent discussion include: (1) the general purpose registers 204 and accompanying NAT registers 242; (2) the instruction pointer ("IP") 212; (3) the current frame marker ("CFM") 214, which stores information related to the current register stack frame allocated for the currently executing routine; (4) AR[RSC] 240, the register stack configuration register that controls operation of the register stack engine; (5) AR[BSP] 238, the register stack engine ("RSE") backing store pointer; (6) AR[BSPSTORE] 242, the RSE backing store pointer for memory stores; (7) AR[RNAT] 244, the RSE NAT-collection register; (8) AR[PFS] 246, the previous-function-state register that contains, among other things, the value that the CFM register held during execution of the most recently executing, but now stacked, routine; (9) the PSR register 226, the IA-64 process status register; (10) the CR[IPSR] 248, CR[IIP] 250, and additional CR registers involved with storing processor state upon interrupts; (11) the CR[IFS] register 252, the interruption-function-state register; and (12) the performance monitor configuration registers 230 and the performance monitor data registers 222.

Figure 3A:
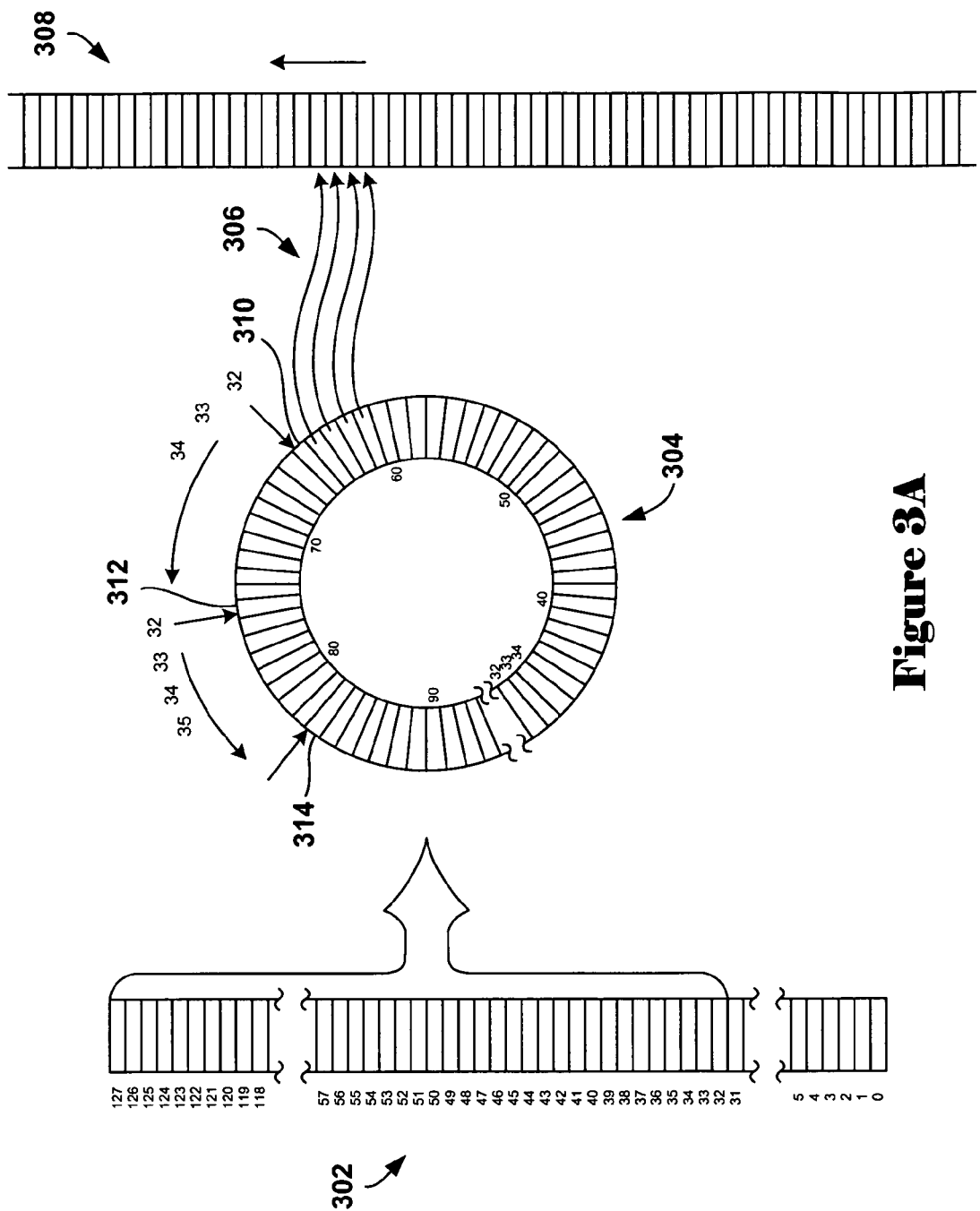
FIGS. 3A-B illustrate the general approach for automated register store and retrieval of register values carried out by the register stack engine ("RSE") provided by the IA-64 architecture.
Figure 3B:
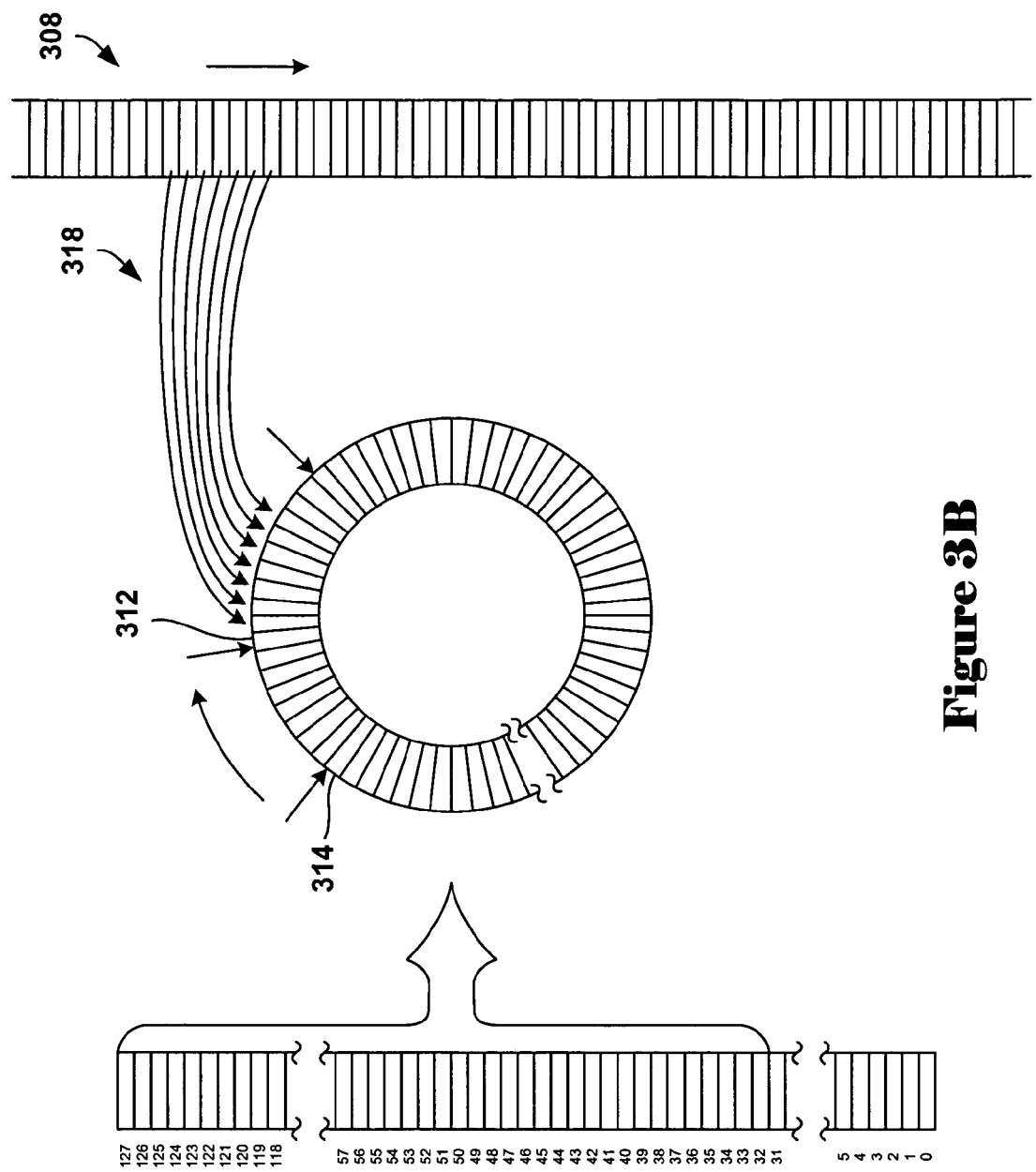

FIGS. 3A-B illustrate the general approach for automated register store and retrieval of register values carried out by the register stack engine ("RSE") provided by the IA-64 architecture. As shown in FIG. 3A, the RSE considers the 96 general purpose registers $GR_{31}$ through $GR_{127}$ 302 to be a circular register buffer 304. The RSE considers this circular register buffer to be essentially infinite, with registers of stacked register-stack frames automatically written 306 to memory 308 by the IA-64 processor, generally using otherwise spare, unused processor cycles essentially asynchronously to routine instruction execution. When a new routine is called, the routine is assigned a new register stack frame. The register stack frame is designated by a pointer into the circular buffer of registers 304. For example, in FIG. 3A, one stack frame begins with register $GR_{65}$ (310), a second stack frame begins with register $GR_{76}$ (312), and the next available stack frame begins with register $GR_{83}$ (314). The currently executing routine is assigned the current stack frame 316 beginning with general purpose register $GR_{76}$. For convenience, the general registers of the current stack frame, registers $GR_{76}$-$GR_{82}$ are renamed to registers $GR_{32}$-$GR_{38}$. The currently executing routine may increase or decrease the size of the current stack frame in order to acquire sufficient general purpose registers needed for computation. Thus, the currently executing routine, in the example shown in FIG. 3A, may assume availability of general purpose registers $GR_0$-$GR_{38}$, with general purpose registers $GR_{32}$-$GR_{38}$ automatically stored to memory and retrieved from memory as a result of routine calls made by the currently executing routine and called routine completion, respectively.

Thus, to summarize, general purpose registers $GR_0$ through $GR_{15}$ are static, and available for use by all routines and processes. General purpose registers $GR_{16}$ through $GR_{30}$ are essentially static for application routines, but are banked to provide scratch space for interrupt-handling routines. General purpose registers $GR_{32}$ through $GR_{127}$ are considered to be a circular register buffer, as shown in FIG. 3A, on which stack frames are allocated for routines, much like the system stack is directly managed by routines in simpler systems as discussed above with reference to FIGS. 1A-F. The circular buffer of registers is composed of the final 96 general purpose registers, but the registers are renamed for convenience of executing processes so that each executing process uses a set of registers with monotonically increasing numerical names, starting from register $GR_0$ to the highest, renamed general register within the routine's currently allocated stack frame. As shown in FIG. 3A, stack frames are allocated, upon routine calls, in a counter-clockwise direction, or in a direction of increasing numerical register name, but wrap around from general purpose register $GR_{127}$ back to general purpose register $GR_{32}$. The number of stack frames ultimately allocated is bounded only by the size of the backing store 308, since stack frames below the currently allocated stack frame are automatically stored to backing store memory and thus freed to allow for allocation of subsequent stack frames. As shown in FIG. 3B, as the most nested routine completes, and releases its stack frame, the next available stack frame pointer 314 moves in a clockwise direction back to the next most recently allocated stack frame 312, which again becomes the current stack frame. Register values in the now current stack frame, if not already reloaded from the backing store, may be restored 318 from the backing store 308 automatically by the processor.

Figure 4:
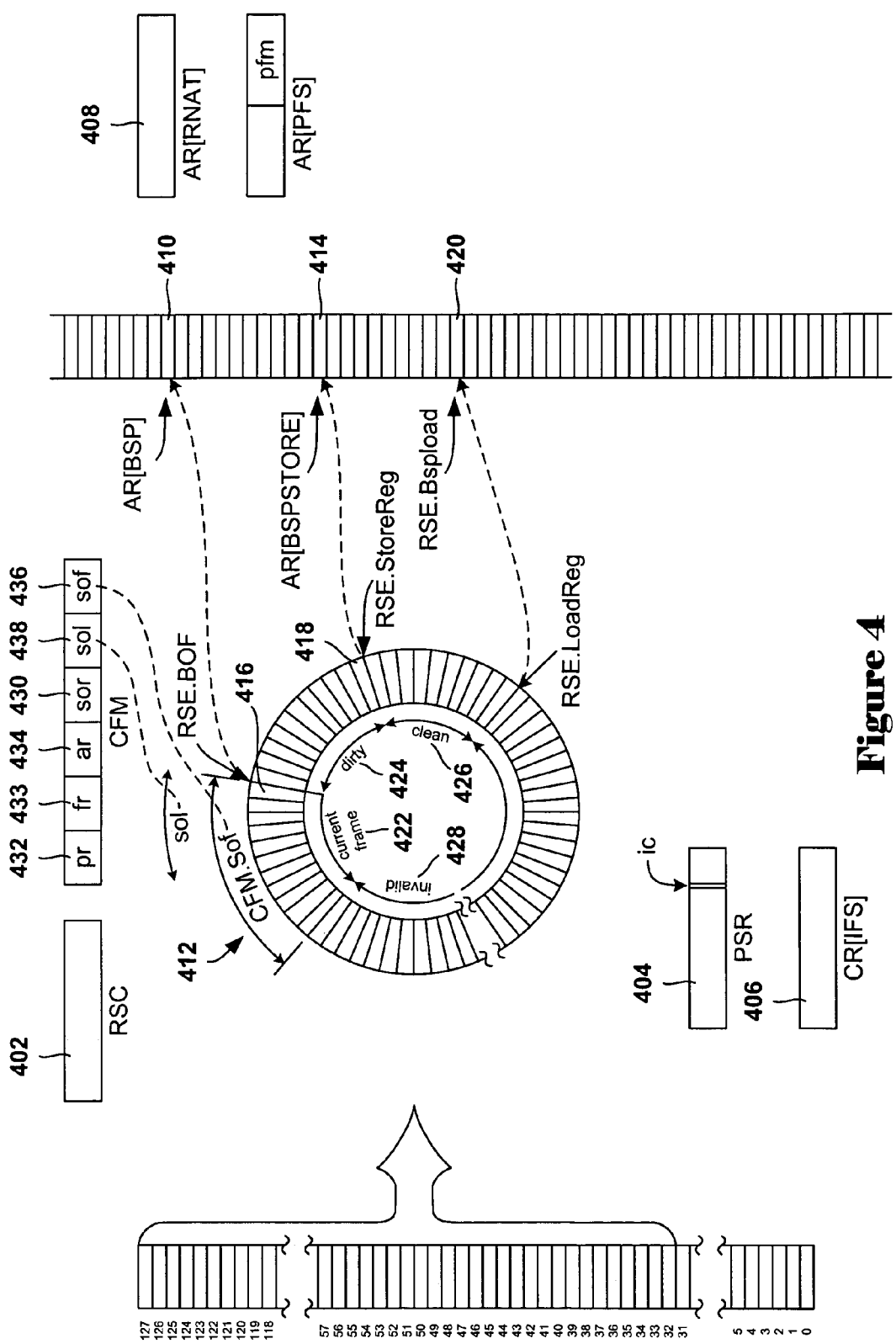
FIG. 4 illustrates control values that control the circular register buffer and the RSE.

FIG. 4 illustrates control values that control the circular register buffer and the RSE. The AR[RSC] register 402 includes fields that specify how aggressively the RSE stores and restores register frames, the privilege level for RSE loads and stores, the endian mode for the RSE, and additional values. The PSR register 404 includes a one-bit field ic that, among other things, determines how portions of processor state are saved, upon an interruption, and how the cover instruction operates. These aspects of the IA-64 architecture are discussed in further detail, below. The PSR register also contains the privilege level at which the processor is currently operating. The CR[IFS] register 406 may receive the value currently stored in the CFM register, upon interruption, and includes a single-bit field v, which indicates whether or not the CR[IFS] register contains a valid, stored CFM value. The AR[RNAT] register 408 accumulates NaT bits associated with general registers stored to backing store and, when filled with NaT bits, is itself written to backing store. Thus, the NaT bits associated with general purpose registers are stored in backing store memory and restored from backing store memory along with the values of the general registers. Every $64^{th}$ 64-bit word value in the backing store contains NaT bits, accumulated in the AR[RNAT] register and written to backing store, associated with the previously stored 63 general registers. The AR[BSP] register contains a memory reference to the next available 64-bit word 410 in the backing store to which the contents of the first word of the current register stack frame 412 may be written following a routine call and allocation of a new, current stack frame. The register AR[BSPSTORE] contains a reference to the 64-bit word in backing store memory 414 to which the RSE will store, or spill, the next dirty register from a nested stack frame.

The IA-64 processor includes various internal registers, not accessible to software routines, which also control RSE operation. These internal registers are notationally referred to by the prefix "RSE" followed by a particular register name. These internal registers include the RSE.BOF internal register, which specifies the general register 416 that represents the first register in the current register stack frame, the RSE.StoreReg internal register that stores an indication of the next general register that needs to be spilled to backing store 418, the RSE.BspLoad internal register, which indicates the next 64-bit word in backing store 420 that needs to be written back to the circular register stack buffer, and the RSE.LoadReg internal register, which stores an indication of the next general purpose register into which the 64-bit memory word referenced by RSE.BspLoad needs to be next loaded.

At any given instant in time, the circular register stack buffer may be considered to comprise four distinct regions. These regions include: (1) the current stack frame 422; (2) a region of dirty registers 424 that contain values from nested stack frames that have not yet been written to backing store; (3) a region of clean registers 426 whose values have been spilled to backing store, but have not been altered since the values were spilled; and (4) a set of invalid registers 428 that do not contain values from nested stack frames and that are immediately available for allocation for expanding the current stack frame or for allocation of new stack frames. The CFM register 430 contains fields that hold values that specify characteristics of the current stack frame. Three of the fields 432-434 contain values that facilitate register renaming. The field sof 436 contains the size, in registers, of the current stack frame. The field sol 438 contains a value indicating the size of the local portion of the current stack frame. The field sor 430 indicates the size of a rotating portion of the stack frame.

FIGS. 5A-G illustrate allocation and de-allocation of a register stack frame associated with a routine call. FIGS. 5A-G, and FIGS. 6A-D that follow, all employ the same illustration conventions. A portion of the circular register buffer 502 is shown in a linear representation, with actual general register names in a column 504 to the left of the portion of the circular register buffer, and the renamed names in a column 506 to the right of the portion of the circular register buffer. In the following, the actual register names are used, although, in practice, only the renamed register names are visible to software. The currently executing routine has been allocated a register stack frame comprising general registers $GR_{77}$ through $GR_{83}$. The currently executing routine has stored two values, symbolically represented in FIG. 5A as "Local 2" and "Local 1" into general registers $GR_{77}$ and $GR_{78}$. The currently executing routine has copied the values stored in the AR[PFS] register 508 into general register $GR_{79}$. The current stack frame size is seven, stored in CFM.sof 510 and the size of the local portion of the current stack frame is five, stored in CFM.sol 512. The registers of the current stack frame not in the local portion of the current stack frame, which comprises general registers $GR_{77}$ through $GR_{81}$, are considered to be the output portion of the current stack frame. The values in these registers are made available to a subsequently called routine, initially comprising the local portion of the stack frame allocated for the called routine. Similarly, the currently executing routine may have received values from the previously executing routine in a lower-end portion of the local part of the current stack frame. Note that routines, as a matter of course, store the contents of the AR[PFS] register 508 into a register within the local portion of the current stack frame so that later, after a series of nested routine calls and completions, the again currently executing routine can restore the value to register AR[PFS] in order to allow for de-allocation of the current stack frame upon completion of the current routine and transfer of control to the previous, most recently nested routine. Note, in FIG. 5A, that the register and memory locations referenced by RSE.BOF and AR[BSP] are indicated. It is assumed that the currently executing routine may be using general registers $GR_{80}$ through $GR_{83}$ for various computation purposes.

Figure 5B:
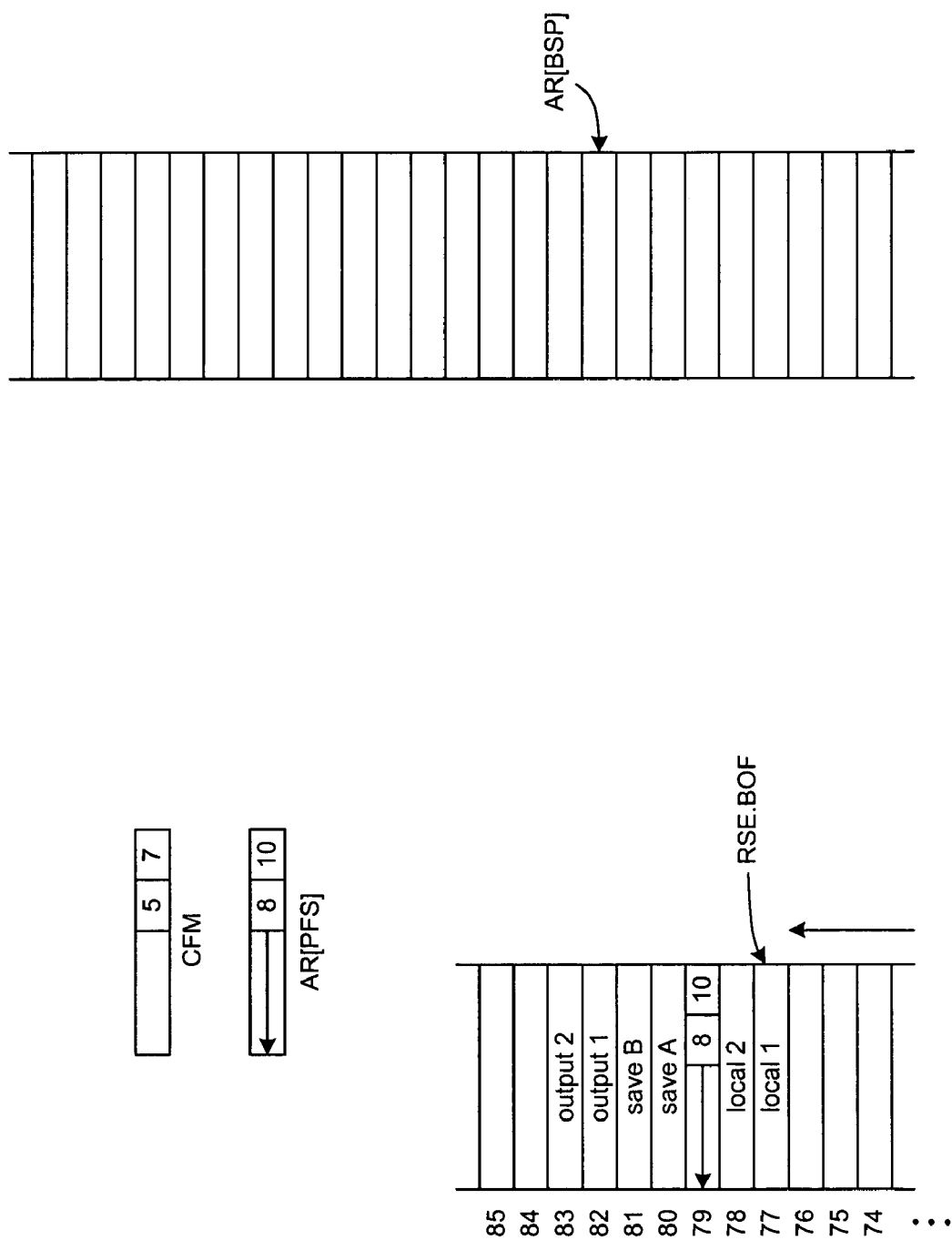

FIG. 5B shows preparations, by the currently executing routine, to call a different routine. As can be seen in FIG. 5B, the currently executing routine has saved two values, symbolically represented in FIG. 5B as "Save A" and "Save B," in general registers $GR_{80}$ and $GR_{81}$, the final two registers in the local portion of the current stack frame, and have placed two output values, symbolically represented in FIG. 5B as "Output 1" and "Output 2" in general registers $GR_{82}$ and $GR_{83}$, the output portion of the current stack frame. An output value in one of registers $GR_{82}$ and $GR_{83}$ includes a pointer to the instruction following the br.call instruction by which the currently executing routine will calls a different routine. This saved instruction pointer is subsequently used to restore the value of the IP register during a transition from the called routine back to the currently executing routine. The stored return IP value and the stored value of register AR[PFS] together provide sufficient information for a subsequent return to the currently executing routine and restoration of the register-based processor state for the currently executing routine, including restoration of the values in the various registers that control RSE operation.

Figure 5C:
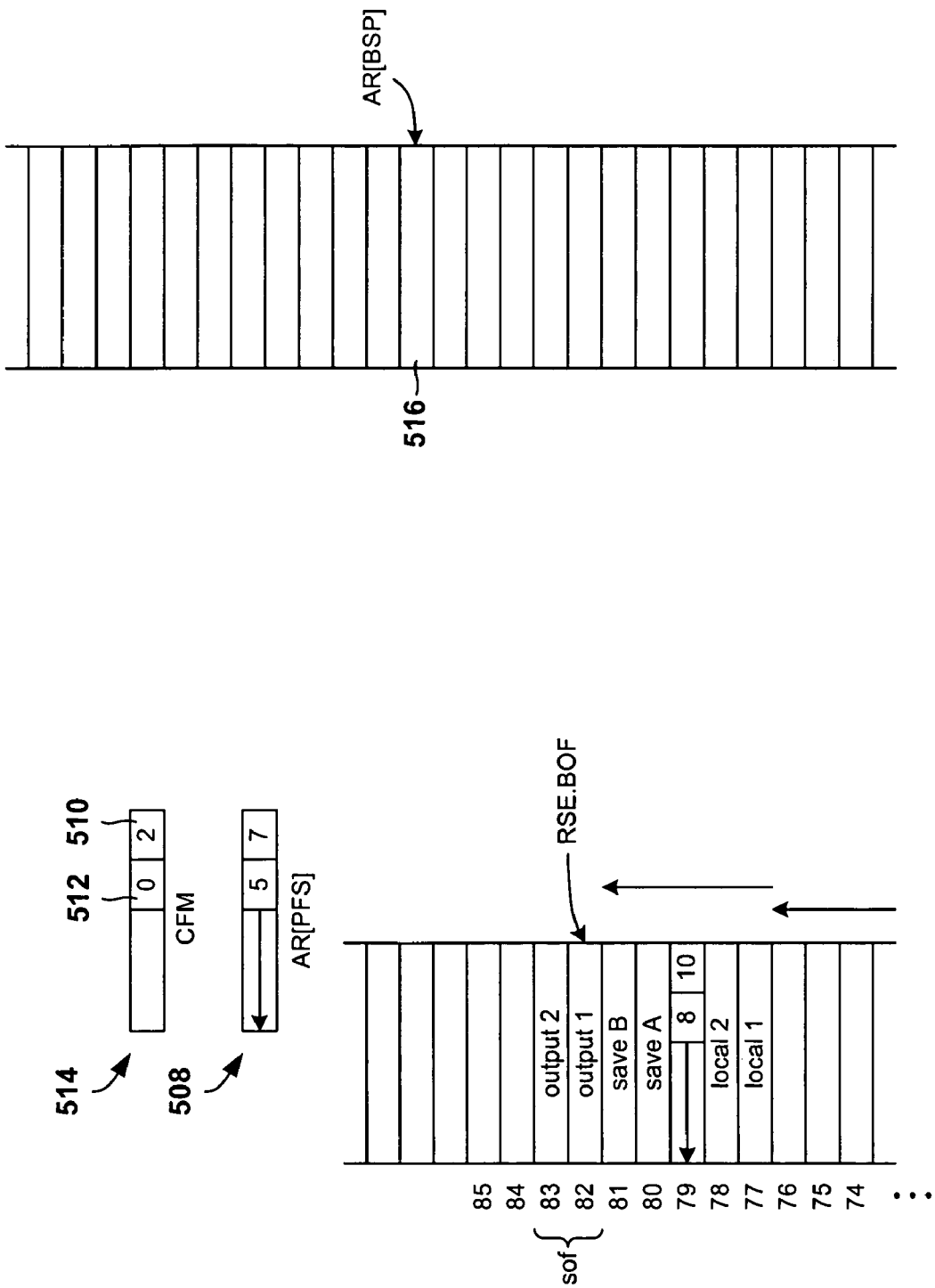
Figure 5D:
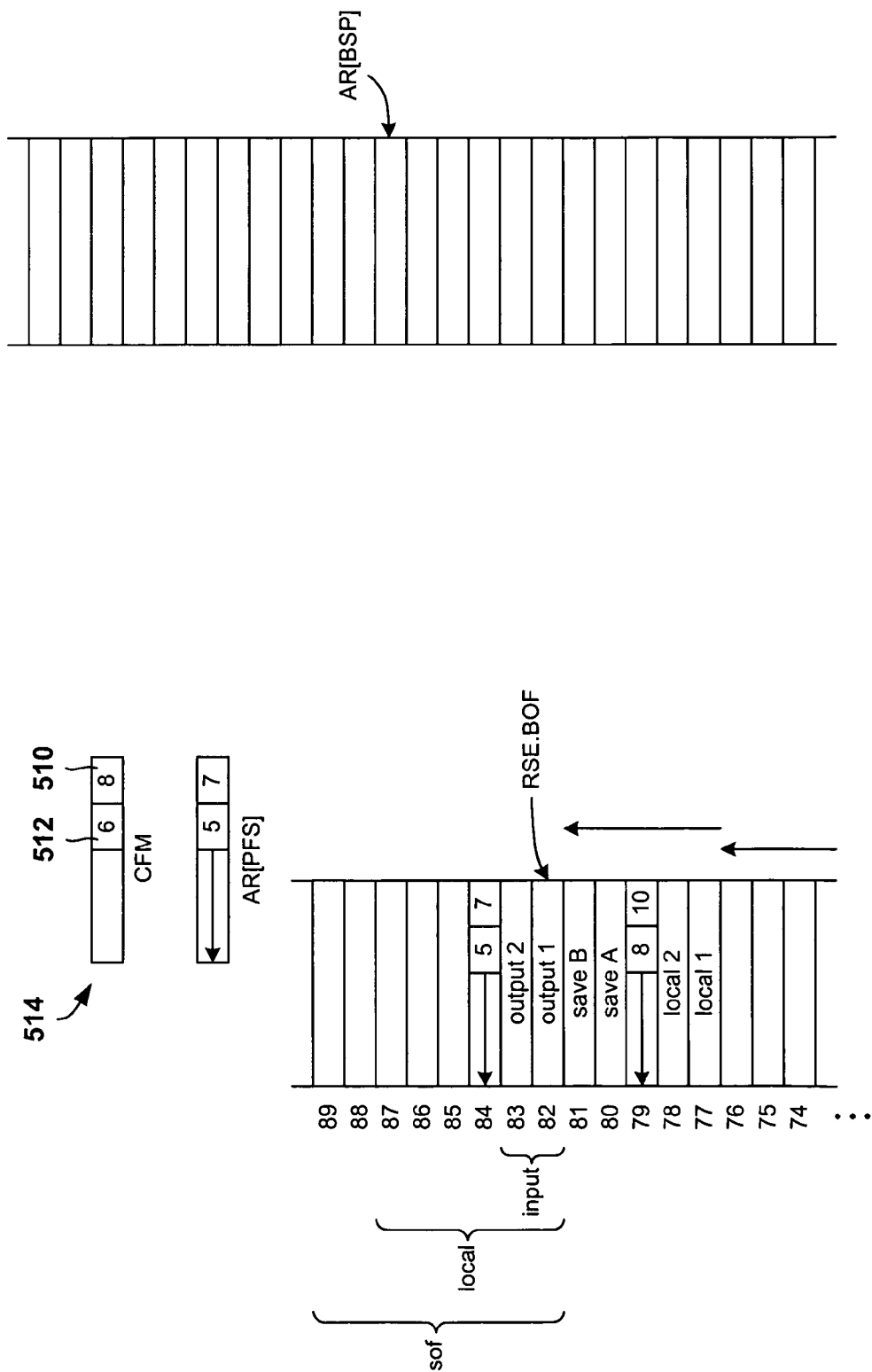

FIG. 5C illustrates a portion of the processor state following execution of the br.call instruction by the previously executing routine associated with the stack frame that begins with general register $GR_{77}$. At the point in time illustrated in FIG. 5C, the called routine has just begun execution. Note that the contents of register AR[BSP] has been adjusted to point to a new location in backing store 526 that represents the next available position for subsequent storing of the new, current stack frame allocated as part of execution of the br.call instruction. Note that the previous value of the CFM register (514 in FIG. 5A) has been moved to the AR[PFS] register 508, and that the CFM 514 contains new values that characterize a newly allocated stack frame currently comprising general registers $GR_{82}$ and $GR_{83}$. Initially, the new, current stack frame consists of the output portion of the previous stack frame, with no registers in the local portion of the newly allocated, current stack frame. Therefore, the CFM contains the value 0 for the sol field 512 and the value 2 for the sof field 510.

The newly executing, called routine generally needs to increase the size of the newly allocated stack frame to provide the called routine with high-speed storage for temporary computed values. Moreover, the called routine needs also to save the contents of the AR[PFS] register in case the called routine in turn calls additional routines, and becomes nested on the register stack below them. In order to increase the current stack frame size, the called routine executes an alloc instruction. The alloc instruction takes arguments that allow the called routine to specify the sizes of the input portion, local portion, and total stack frame desired by the called routine. In the example shown in FIG. 5D, the called routine has specified, via an alloc instruction, a current stack frame comprising a two-register input portion, including general registers $GR_{82}$ and $GR_{83}$, a four-register local portion comprising general registers $GR_{84}$-$GR_7$, and a total current stack frame comprising general registers $GR_{82}$-$GR_{89}$. The input portion of the current stack frame indicates the number of registers received by the called routine that were part of the previously executing routine's stack frame, and is included within the local portion of the current stack frame. Note that the sof 510 and sol 512 values of the CFM register 514 have been updated to reflect the new current stack frame.

Figure 5E:
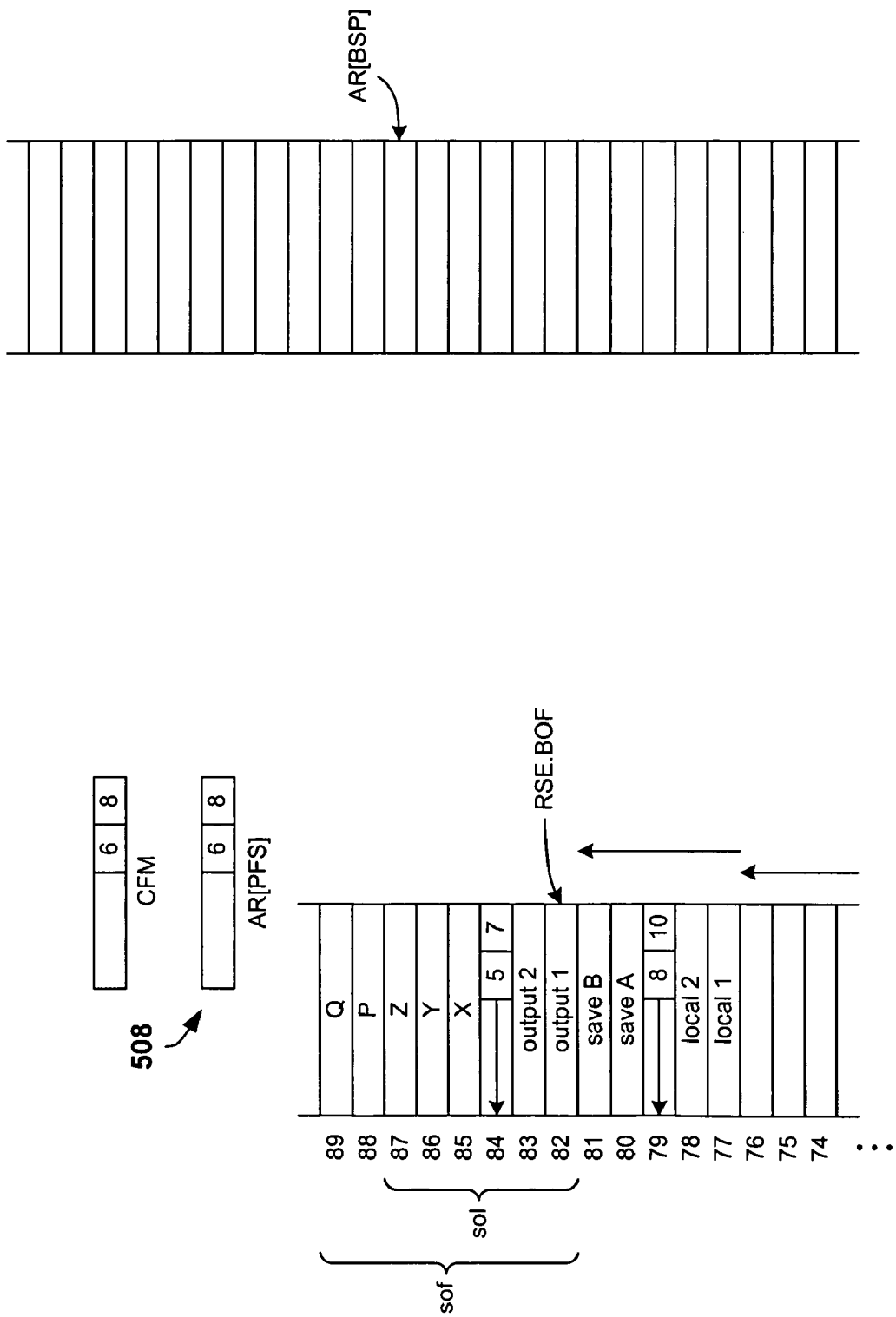
Figure 5F:
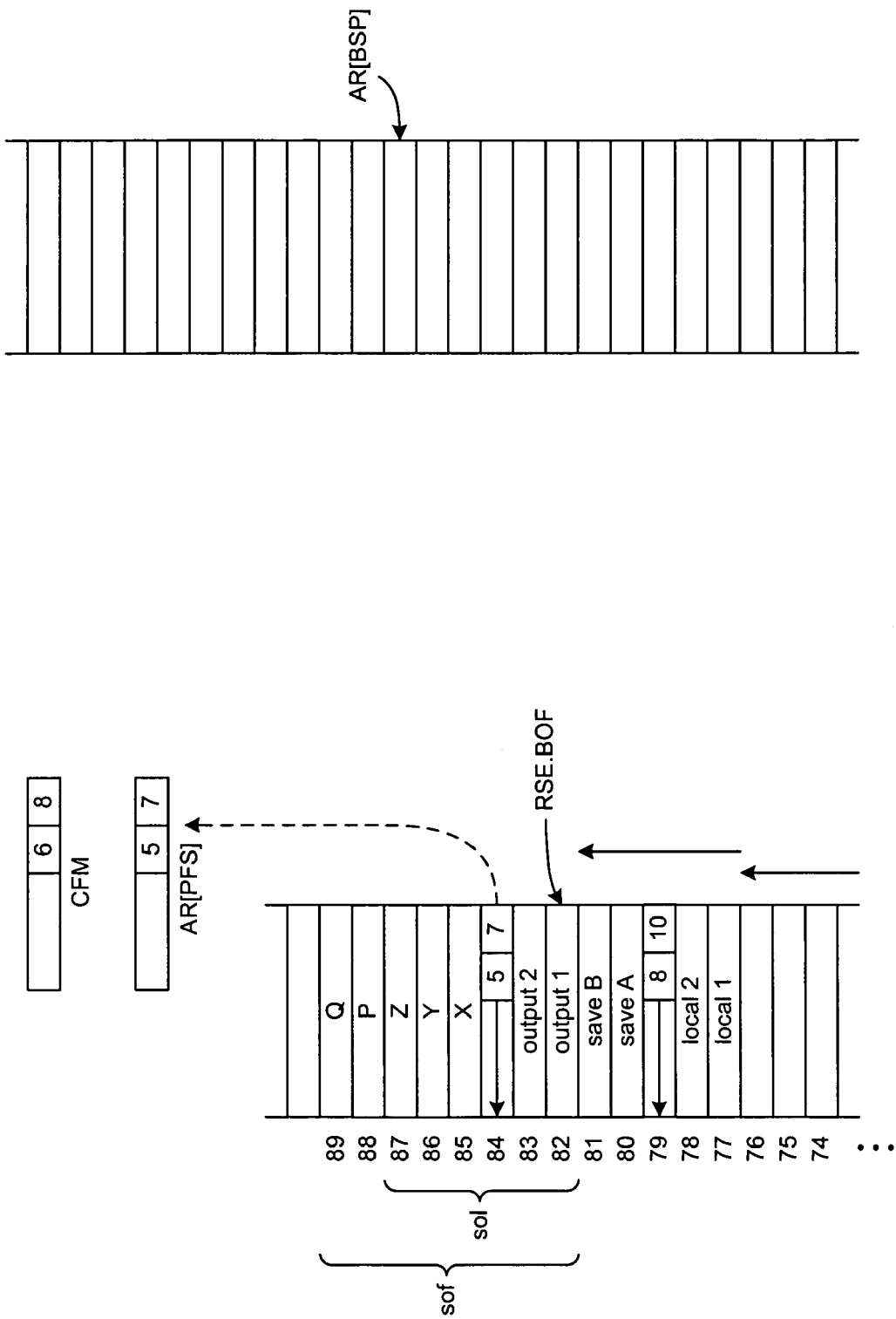
Figure 5G:
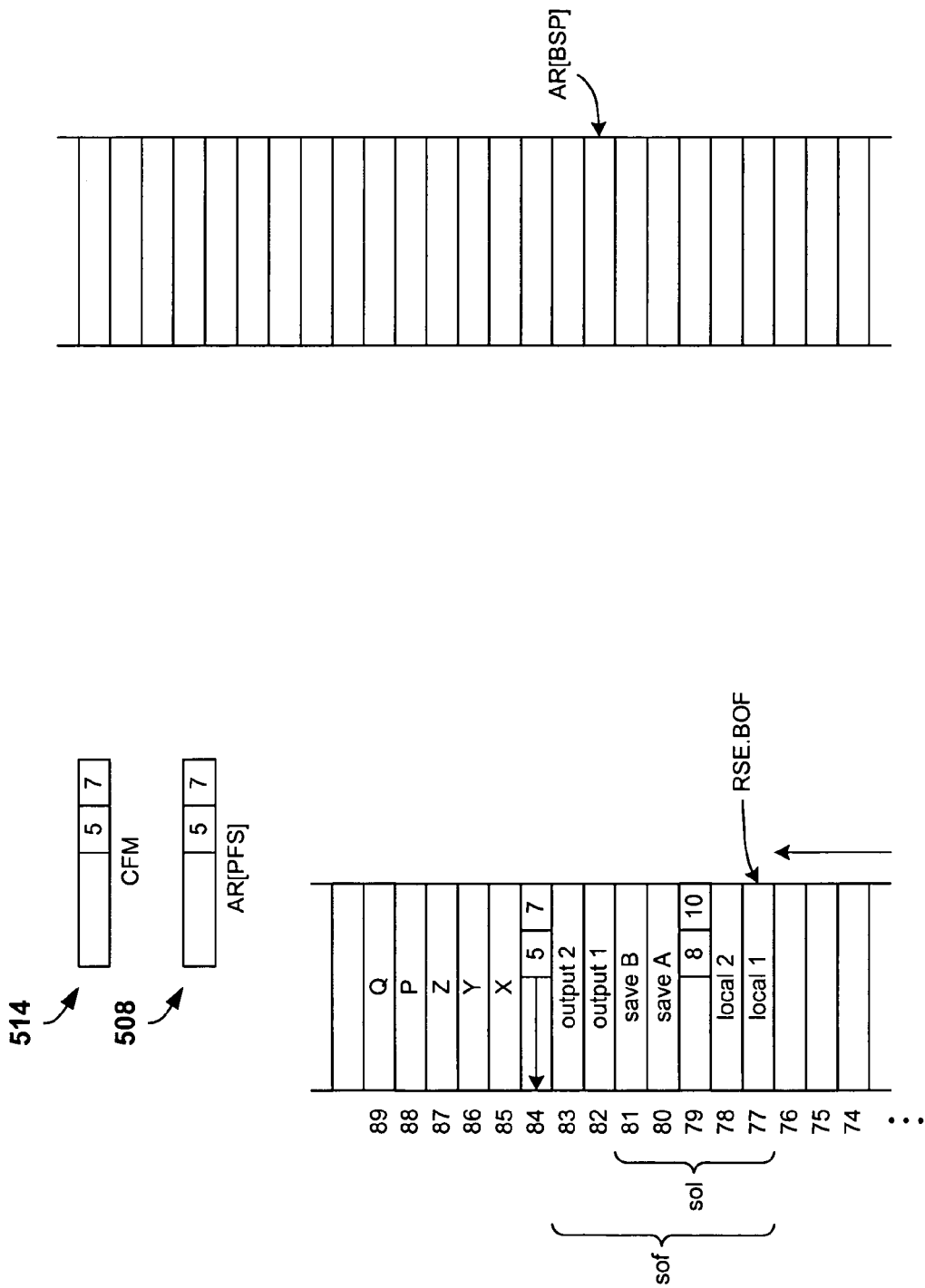

As shown in FIG. 5E, the called routine may carry out various computations, storing temporary values "X," "Y," and "Z," in registers of the current stack frame, and may, in addition, store output values "Q" and "P" in registers in the output portion of the current stack frame for passing to a subsequently called routine. Note that, as shown in FIG. 5E, subsequent routine calls and subsequently called routine terminations may end up altering the contents of the AR[PFS] register 508.

Finally, the called routine terminates. In order to transfer control back to the calling routine, the called routine must first copy the stored contents of the AR[PFS] routine from the called routine's current stack frame to the AR[PFS] register. Next, the called routine executes a br.ret instruction to return control to the calling routine. The called routine uses the IP value stored by the calling routine in an output register of the calling routine, and therefore in a local register of the called routine, in the register stack as a target for the br.ret instruction. Execution of the br.ret instruction results in resetting of the RSE.BOF internal register and the AR[BSP] registers to their previous values, de-allocating the stack frame allocated for the called routine, and restoring the stack frame allocated for the calling routine. The contents of the CFM register 514 have been updated to contain the contents of the AR[PSF] register 508. Thus, the processor state for the calling routine has been restored, including all the values of the stacked registers for the calling routine, referenced by the calling routine as general registers $GR_{32}$ through $GR_{38}$.

Figure 6A:
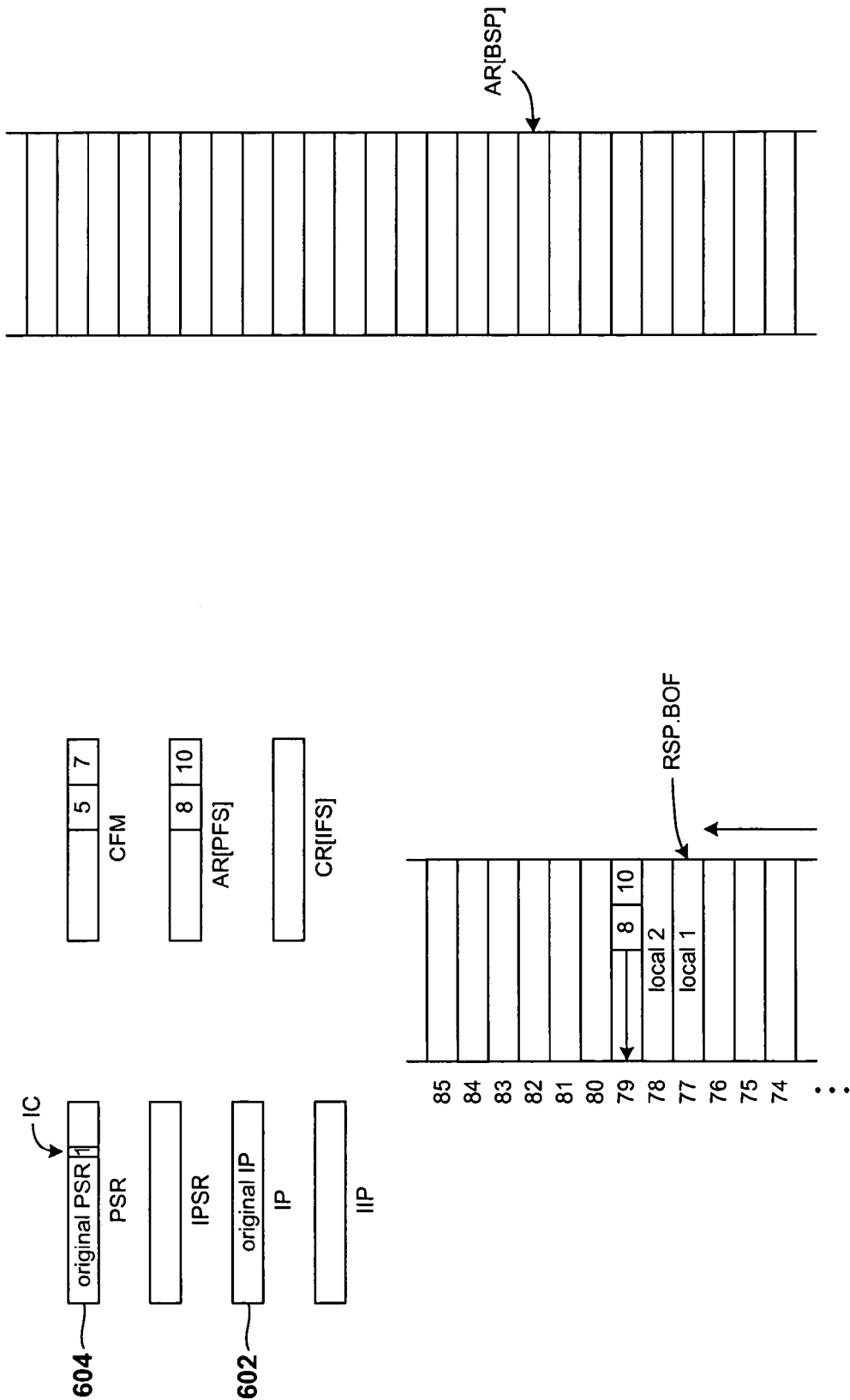
FIGS. 6A-D illustrate RSE operation in relation to interrupt handling by an IA-64 processor.

FIGS. 6A-D illustrate RSE operation in relation to interrupt handling by an IA-64 processor. FIG. 6A shows a portion of the current, register-based processor state of a processor that is currently an executing routine. The portion of the processor state illustrated in FIG. 6A includes values of the IP register 602 and the PSR register 604. In particular, the ic field of the PSR register 604 contains the value "1."

Figure 6B:
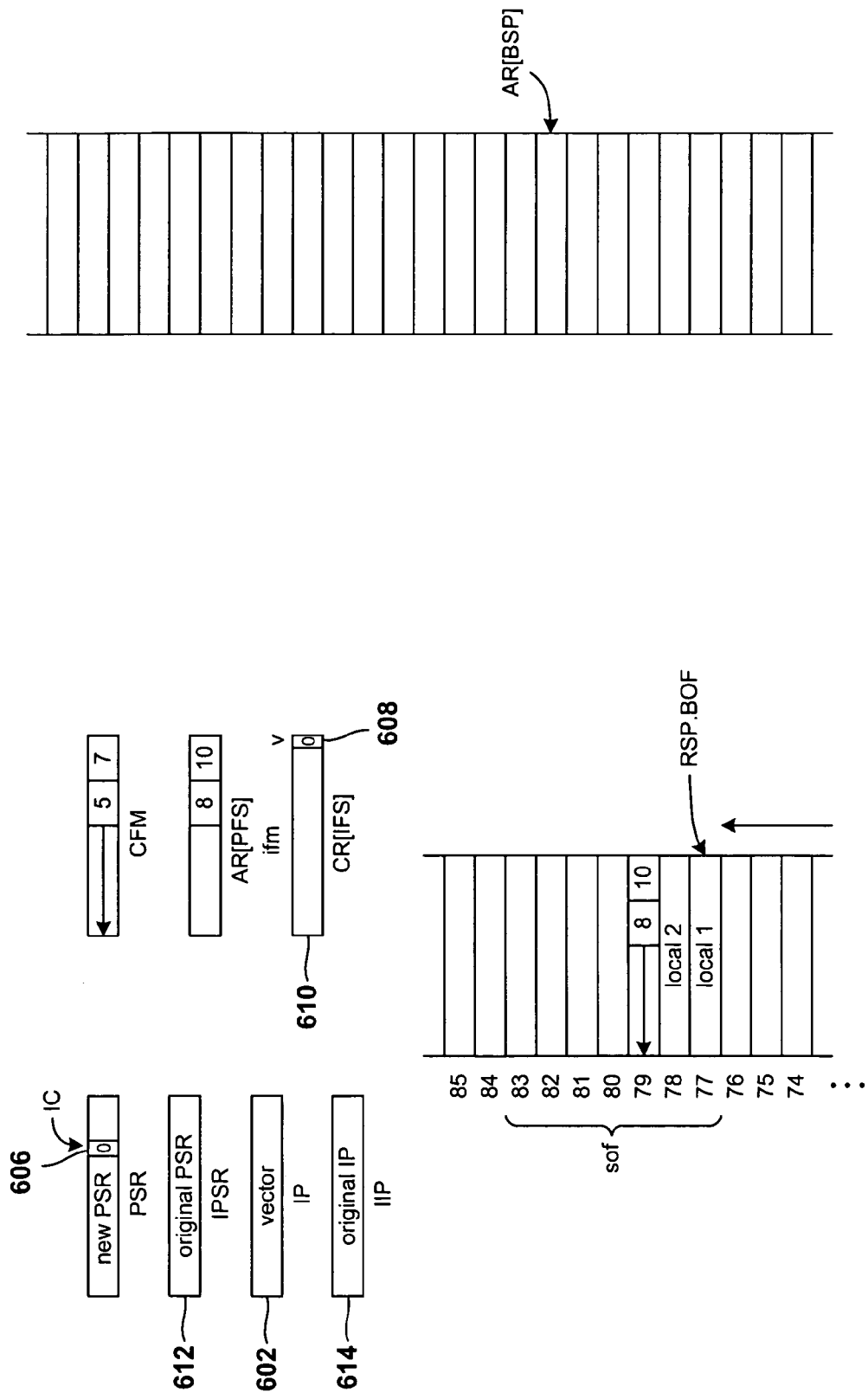

FIG. 6B illustrates a portion of the processor state following an interruption. Initially, the interruption has not altered the RSE-related register and internal register values, but has changed the value of the ic field in the PSR register to "0" 606. Note that the value of the v field 608 of the CR[IFS] register 610 is also 0. Note also that the original contents of the PSR have been copied to the IPSR register 612 and the original contents of the IP register have been copied to the IIP register 614. The current contents of the IP register 602 now contain a reference to an interrupt-handling vector. Whether or not the contents of the PSR and IP are copied to the IPSR and IIP registers, respectively, is controlled by the value of the ic field of the PSR register. Normally, when non-privileged routines are executing, the ic field of the PSR register has a value "1." This value indicates that the contents of the IP and PSR registers should be copied to the IIP and IPSR registers, respectively, upon interruption. Moreover, upon interruption, the ic field of the PSR register is cleared. Clearing of the ic field essentially turns off processor-state storage in the case that a subsequent interruption occurs. If a subsequent interruption occurred, the IPSR and IIP registers would again be overwritten, removing information needed to return to the initially interrupted application routine.

Figure 6C:
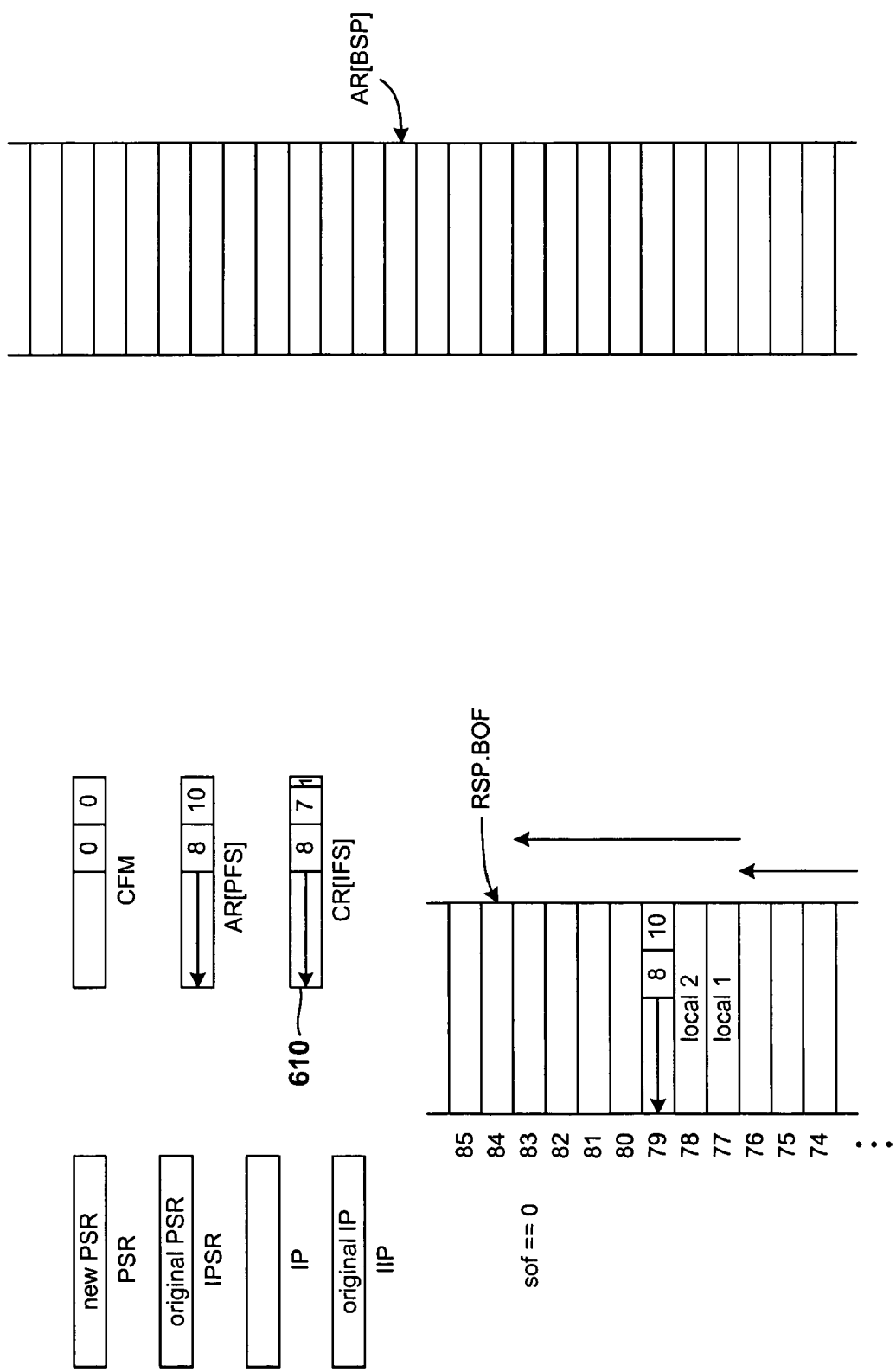
Figure 6D:
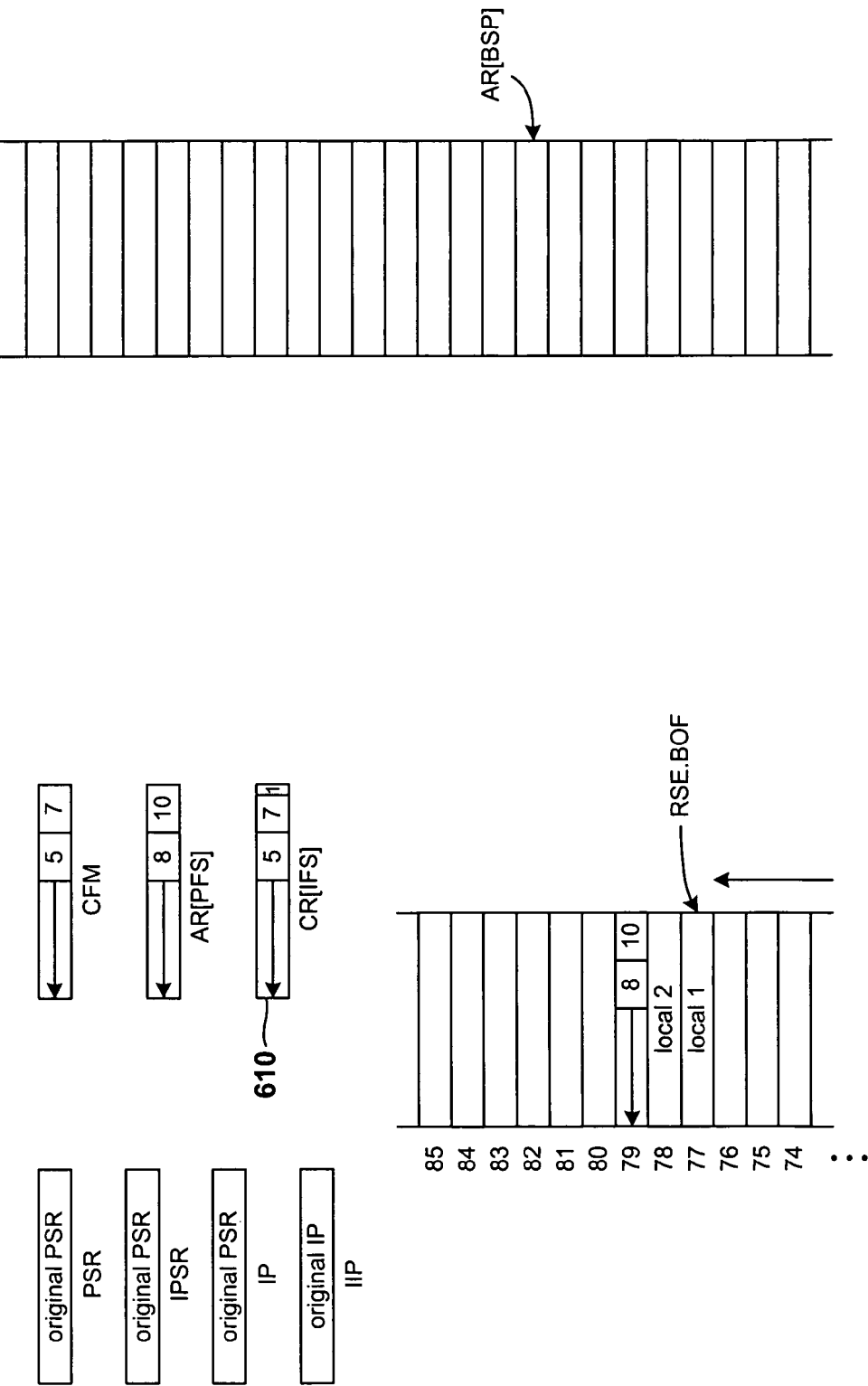

The RSE-controlling internal registers and application registers are not updated to provide a pathway for extremely efficient interruption handling for interrupt handlers that can handle an interrupt using the first 16 general purpose registers and the banked register set $GR_{16}$ through $GR_{30}$. This fast-path mechanism decreases the overhead associated with interrupt handling. However, in the case that the interrupt handler needs additional general-register resources, the IA-64 architecture provides a mechanism for those resources to be obtained. The interrupt handler may issue a cover instruction which has the effect of allocating a new, current register stack frame of size 0 and thus moving the stacked registers allocated for the interrupted routine from the current stack frame to the dirty-register region. FIG. 6C illustrates a portion of the processor state following execution of a cover instruction by the interrupt handler. When the PSR.ic field has a value "0," as it does following an interruption, the cover instruction also copies the contents of the CFM register to the ifm field of the CR[IFS] register 610. The v field of the CR[IFS] register 610 is set to "1," to indicate that the CR[IFS] register contains a valid copy of the CFM. The CFM is then updated to reflect the newly allocated stack frame of size 0. The interrupt handler can then allocate additional general register resources in order to carry out interrupt handling. Finally, the interrupt handler finishes, and executes an rfi instruction to return control back to the interrupted routine. In executing the rfi instruction, the processor notes that the v field of the CR[IFS] register 610 has the value "1," and copies the contents of the CR[IFS] .ifm field into the CFM. Following execution of the rfi instruction, the original processor state of the interrupted routine is restored. Note that, when the PSR.ic field has a value "1," the cover instruction does not store the current contents of the CFM into CR[IFS].ifm, and does not set the field CR[IFS].v to 1. The cover instruction is not privileged, and can be executed by an application routine in order to allocate a new, zero-length current stack frame. However, because only a privileged routine can set PSR.ic to "0," on a privileged routine, including an interrupt handler, can obtain the full benefit of the cover instruction, namely storing of the contents of the CFM register into CR[IFS] .ifm.

The IA-64 architecture provides two additional instructions relevant to RSE operation. The flushrs instruction directs an IA-64 processor to flush all dirty registers to backing store, and the loadrs instruction directs the IA-64 processor to reload register values stored in backing store to general-purpose registers.

Embodiments of the Present Invention

Figure 7A:
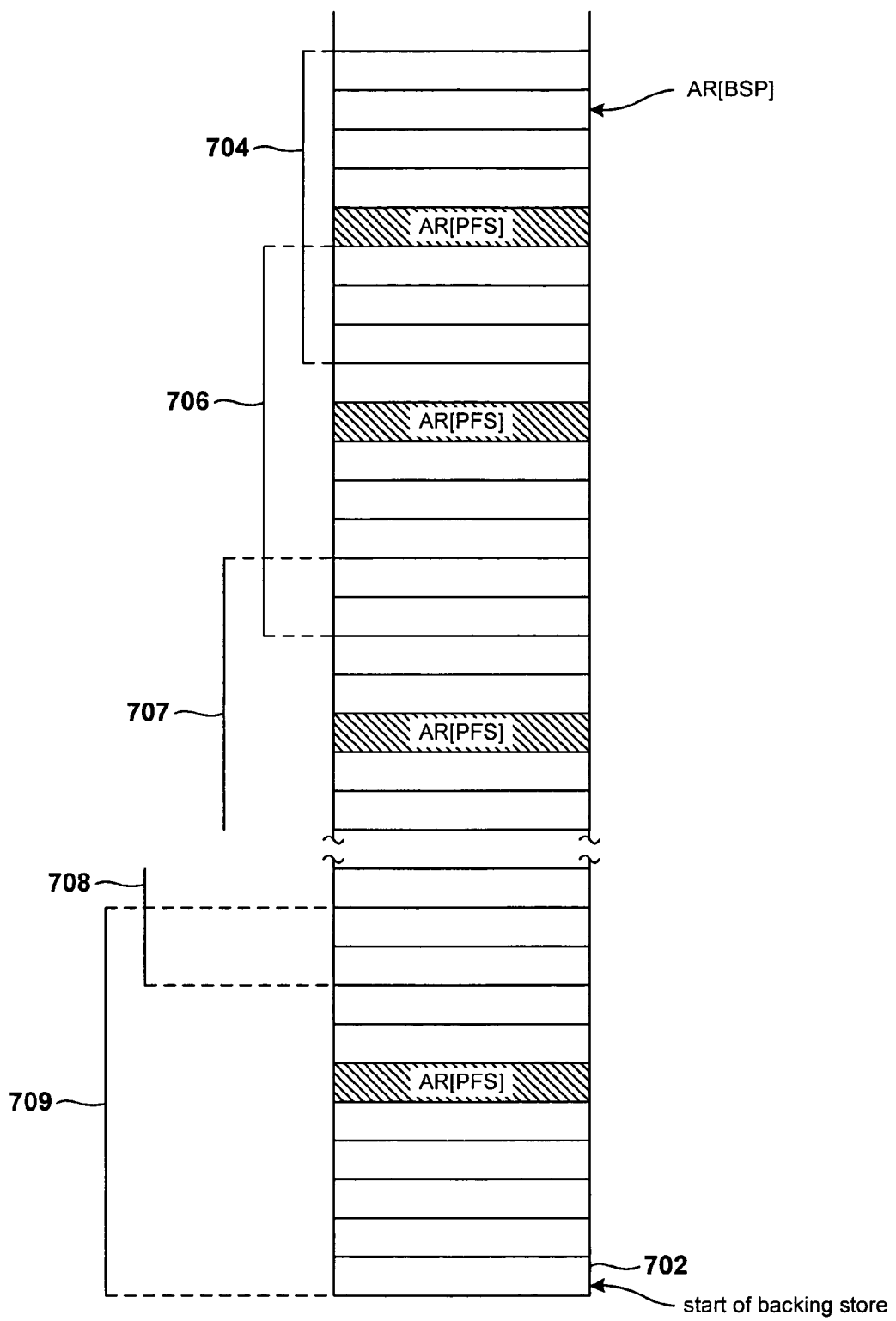
FIGS. 7A-C illustrate a general technique employed by certain embodiments of the present invention.
Figure 7B:
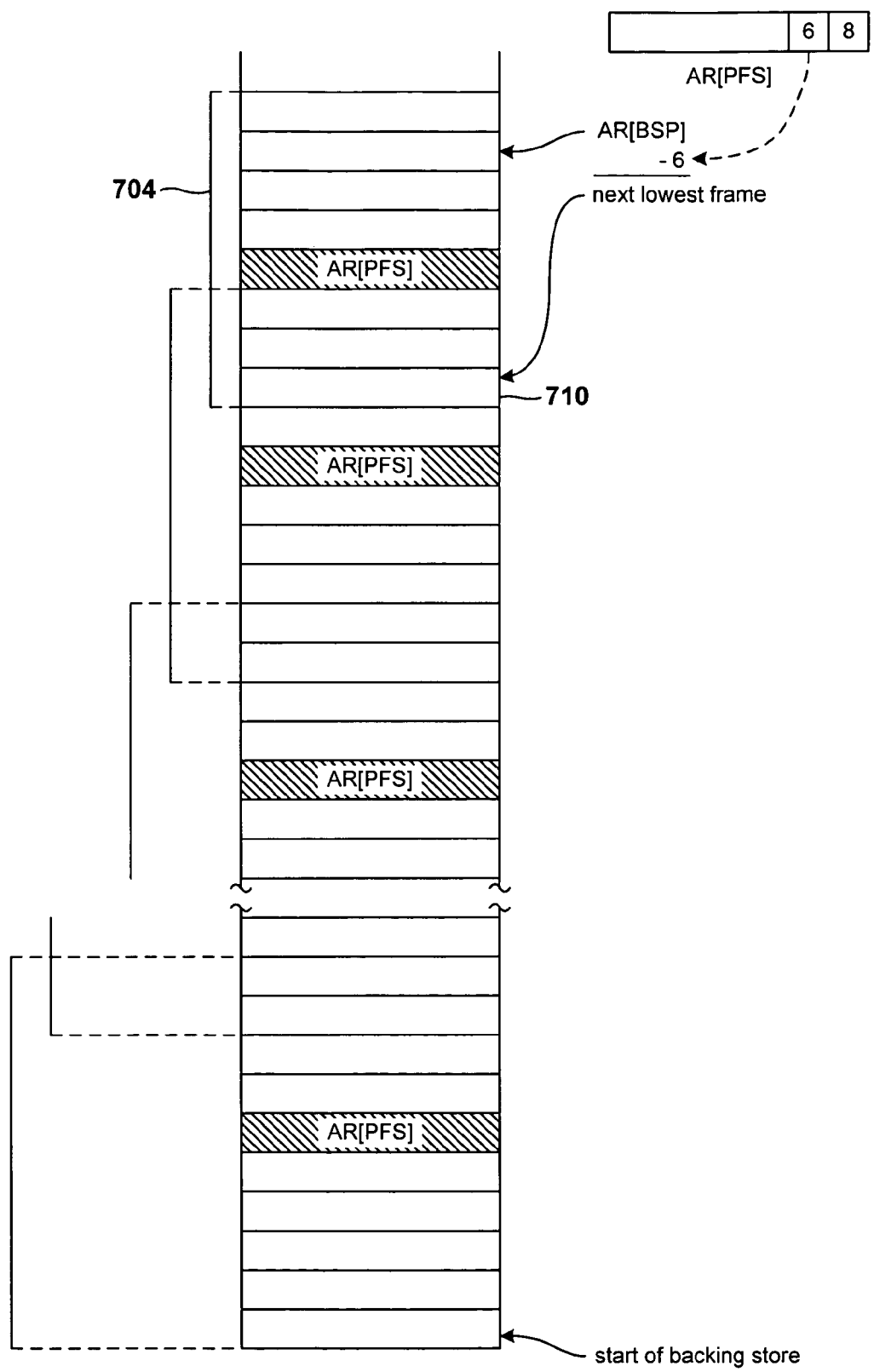
Figure 7C:
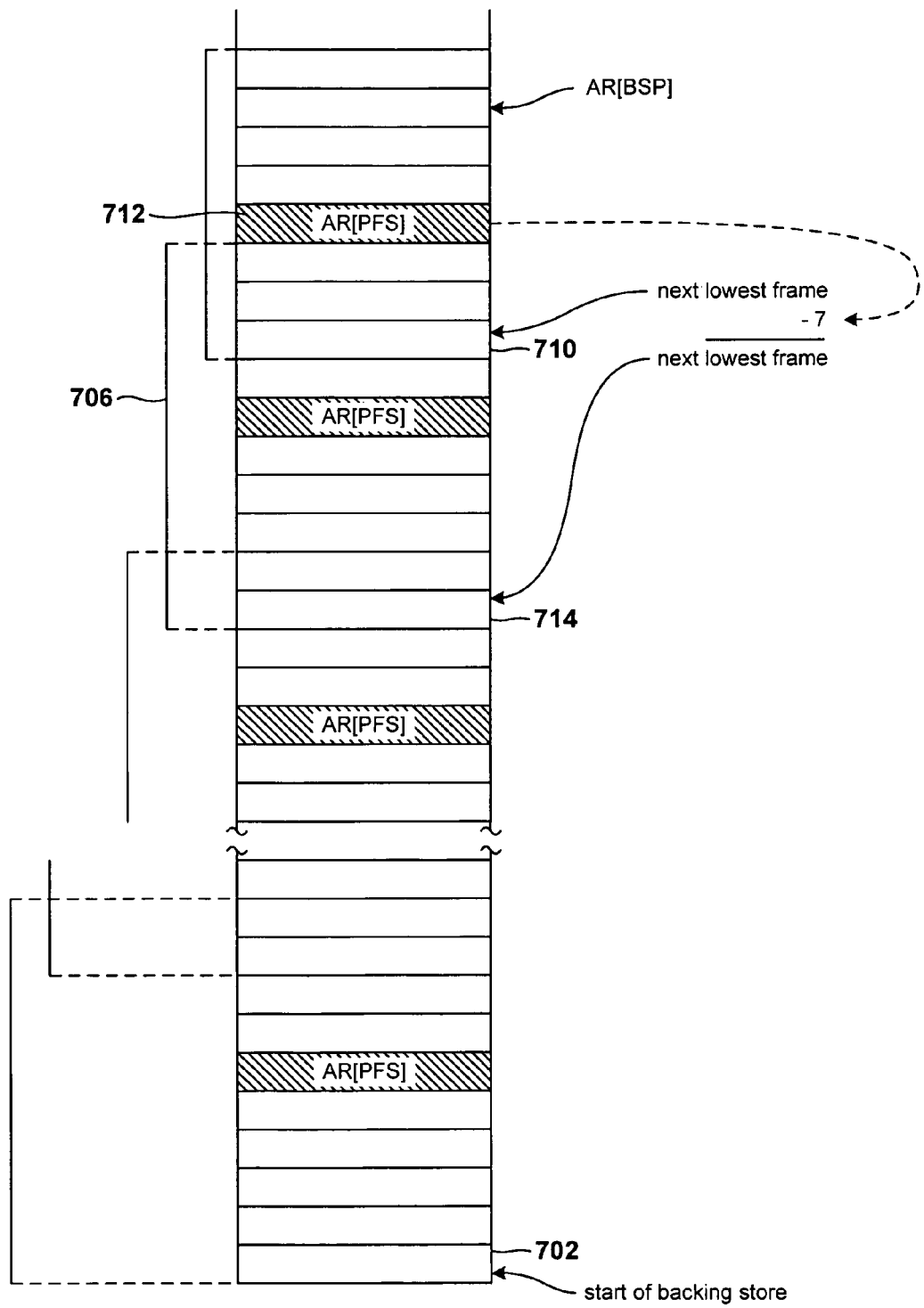

FIGS. 7A-C illustrate a general technique employed by certain embodiments of the present invention. FIG. 7A illustrates the general format for information stored within the backing-store memory of an IA-64-based system. The backing-store memory begins at a known location 702 and extends in the direction of larger memory addresses. Values stored in the backing store are organized into stack frames, as discussed above, each stack frame including the stored contents of the AR[PFS] register at the point in time when the stack frame was the current stack frame for a currently active routine or procedure. In FIG. 7A, the stack frames are indicated by vertical lines to the left of the representation of a backing-store memory, such as vertical line 704 indicating the memory locations that together compose the most recently saved stack frame in the backing-store memory. Previously stored stack frames, corresponding to nested routines 706-709, extend downward, in memory addresses, ending with a first saved stack frame 709 that begins at the memory location representing the start of the backing store 702.

As shown in FIG. 7B, the extent of the most recently stored stack frame 704 can be determined by subtracting AR[PFS].sol from the contents of AR[BSP] to obtain a pointer, "next lowest frame," to the start 710 of the most recently stored stack frame 704. A slight complexity in this calculation concerns storage of the contents of the NAT collection register AR[RNAT] at regular intervals within the backing-store memory. How these intermittent stored values are dealt with is described, in detail, below. In general, one additional memory location may need to be subtracted from the contents of AR[BSP] in the case that the contents of AR[RNAT] have been stored within the most recently stored stack frame. Then, as shown in FIG. 7C, the beginning memory location for the second most recently stored stack frame 706 can be determined by subtracting the saved contents of AR[PFS].pfm 712 from the current value of the memory reference pointer "next lowest frame" 710 to generate a new value for the memory reference pointer "next lowest frame" 714 that points to the beginning of the second most recently saved stack frame 706. Again, the presence of stored contents of the AR[RNAT] register within the second most recently stored stack frame may adjust the pointer "next lowest frame" downward by an additional memory word. This same technique can be repeatedly applied to traverse all of the stack frames stored in backing-store memory. A successful traversal should eventually generate a value for the pointer "next lowest frame" equal to the start of the backing store 702.

Thus, the only significant challenge in traversing the stored stack frames in backing-store memory is identifying the memory locations at which the contents of the AR[PFS] register have been saved. It would be convenient if these memory locations were found at a particular, fixed offset from the beginning of a stack frame, but unfortunately this is not the case. Therefore, techniques must be applied to identify the location, within each stored stack frame, at which the contents of the AR[PFS] register have been stored. In one technique, each memory location within a stored stack frame may be evaluated, by a set of heuristic tests, in order to evaluate whether the location contains the contents of the AR[PFS] register.

Figure 8:
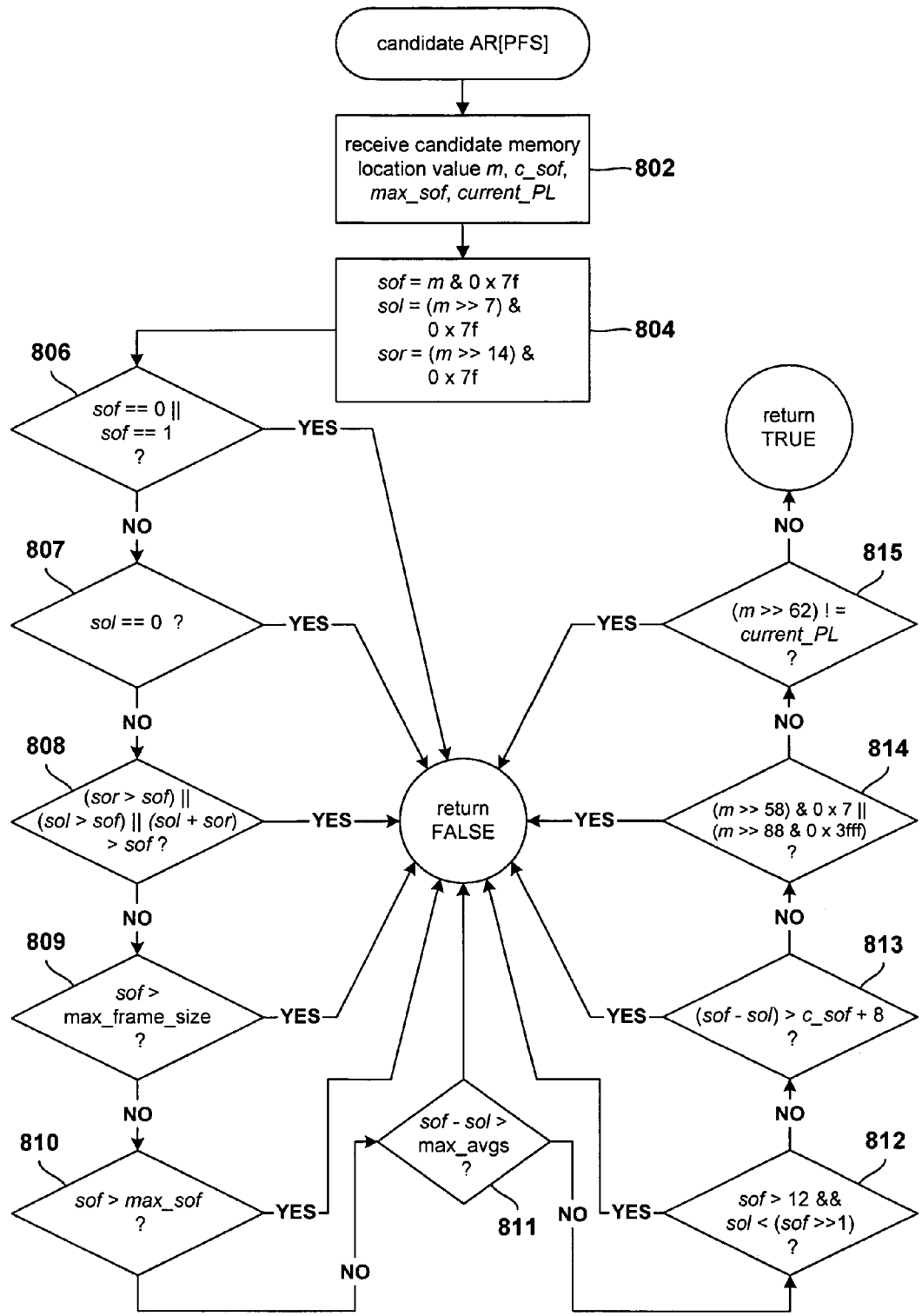
FIG. 8 is a control-flow diagram for a routine "candidate AR[PFS]" that evaluates the contents of a candidate AR[PFS] value, using a series of heuristic tests, to determine whether or not the candidate AR[PFS] value is, in fact, a stored AR[PFS] value, according to one embodiment of the present invention.

FIG. 8 is a control-flow diagram for a routine "candidate AR[PFS]" that evaluates the contents of a candidate AR[PFS] value, using a series of heuristic tests, to determine whether or not the candidate AR[PFS] value is, in fact, a stored AR[PFS] value, according to one embodiment of the present invention. In step 802, the routine receives a candidate memory location value m that may contain the stored contents of the AR[PFS] register, as well as the values of the current frame c_sof, the maximum possible size of a next most recently stacked frame max_sof, and the current privilege level currentPL for the routine that saved the AR[PFS] value. Next, in step 804, the routine extracts the sof, sol, and sor fields from the candidate's memory location value m. Then, a set of heuristic tests are employed to evaluate whether the candidate memory location value m represents the stored contents of the AR[PFS] register. In step 806, the routine determines whether the extracted sof has a value "0" or "1." If so, then the routine returns FALSE, since a stack frame must contain at least two stored register values for the IP register and the saved contents of the AR[PFS] register. Next, in step 807, the routine determines whether or not the extracted sol has the value "0." A stack frame without a local portion would correspond to a function or routine with no inputs or local variables, and thus, when the extracted sol has the value "0," the routine returns FALSE. Next, in step 808, the routine test to see whether any of the extracted lengths sor, sol, or sol+sor exceeds the extracted frame size sof. If so, the values cannot be part of a valid AR[PFS] value, and the routine returns FALSE. Next, in step 809, the routine determines whether the extracted sof is greater than the maximum possible frame size or, in other words, whether the extracted sof exceeds the maximum frame size, which in current IA-64 implementations is 96, the number of automatically stacked registers. If so, then the routine returns FALSE. Next, in step 810, the routine determines whether the extracted sof exceeds the remaining size of the backing-store memory. If so, then the routine returns FALSE. Next, in step 811, the routine determines whether the size of the output portion of the next most recently stacked stack frame, determined by subtracting the extracted sol from the extracted sof, exceeds the language-standard maximum number of arguments that can be passed to a called routine. If so, then the routine returns FALSE. Next, in step 812, the routine determines whether, for a reasonably sized stack frame, the local portion of the stack frame is significantly smaller than the output portion of the stack frame. Such an imbalance in the sizes of the local portion of the stack frame versus the total size of the stack frame, or output portion of the stack frame, is possible, but infrequently encountered. If an imbalance between the local portion of the stack frame and the total size of the stack frame is detected in step 812, the routine returns FALSE. Next, in step 813, the routine determines whether the number of output registers is significantly larger than the current stack frame size. If so, then the routine returns FALSE. Next, in step 814, the routine checks to make sure that any reserved fields of the AR[PFS] register within the stored value are 0. If the reserved fields are not 0, then the routine returns FALSE. Finally, in step 815, the routine determines whether or not the previous privilege level field within the stored value m is not equal to the privilege level of the routine that stacked the value m. If the previous privilege level field is not equal to the current privilege level of the routine that stacked the value m, then the routine returns FALSE.

The heuristic tests employed by the routine "candidate AR[PFS]" represent a number of tests found valuable in one computer-system environment. Not all of these tests may necessarily apply to other computer-system environments and, conversely, many additional heuristic tests may be suitable in other environments. Certain of the heuristic tests are derived from understanding of the standards and the compiler implementations for languages employed in a computer system, an understanding of the normal programming practices used to develop software that runs on the computer system, and other such information, while other heuristics, such as the heuristic used in step 810, are generally applicable to AR[PFS] values for a particular processor architecture.

Figure 9:
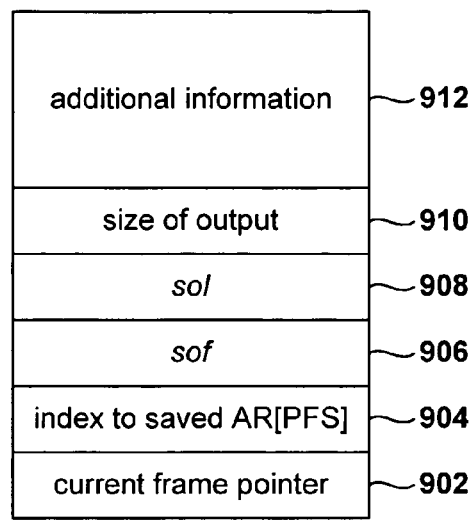
FIG. 9 shows the format for each record that is stored on the stacked data structure used by routines of one embodiment of the present invention.

Next, a series of routines that implement one approach to interpreting stored values in the backing-store memory in an IA-64-based system are provided. It should be noted that this approach represents only one of many possible approaches to reconstructing the stack frame boundaries within the memory locations of backing-store memory. In the described approach, a stack data structure is used to accumulate information about the stack frames identified within the backing-store memory, in reverse order from the order in which frames are stacked in the backing store. FIG. 9 shows the format for each record that is stored on the stacked data structure used by routines of one embodiment of the present invention. The record includes the value of a current frame pointer 902, an index within the current frame to the saved AR[PFS] value 904, the size of the current frame 906, the size of the local portion of the current frame 908, the size of the output portion of the current frame 910, and any additional information that may be useful in subsequently accessing or displaying stacked frames in the backing-store memory 912.

Figure 10:
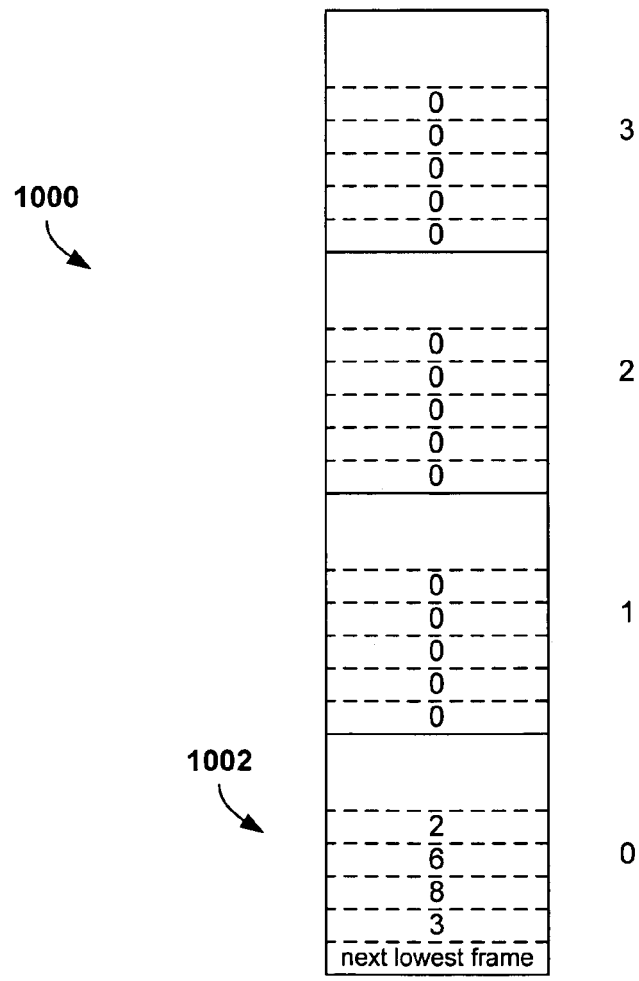
FIG. 10 shows the stacked data structure used by routines of one embodiment of the present invention.

FIG. 10 shows the stacked data structure used by routines of one embodiment of the present invention. FIG. 10 shows the stacked data structure following initialization by the highest level routine. The first data record 1002 on the stack describes the highest level stack frame identified in the backing-store memory. Each next most recently stored stack frame identified in the backing-store memory is represented by data structures stacked at successively larger indices within the stack data structure 1000 shown in 10. Once the data structure shown in FIG. 10 has been completed, the backing-store memory can be repeatedly traversed subsequently by debuggers or analysis tools in order to recover stored register values for nested routines.

FIG. 11 is a control-flow diagram for a routine "update data structure" that stores values into a data record of the type illustrated in FIG. 9 for stacking onto the data structure shown in FIG. 10 that represents one embodiment of the present invention. The index for the data record is received in step 1102 as parameter j, as are the additional parameters "next_lowest_frame" and "candidate," which indicate the starting point for a currently considered stack frame and the memory location within the stack frame currently considered to be a candidate location in which the contents of the AR[PFS] register has been stored. The parameter "candidate" can be thought of as a memory reference, while the contents of that memory reference are referred to as "AR [PFS]." In step 1104, the current frame pointer field of the data structure is written. In step 1106, the offset, in memory words, to the candidate register is computed and stored in the second field (904 in FIG. 9) of the data record. In step 1108, the sof and sol fields (906 and 908 in FIG. 9) of the data record are written after being extracted from the candidate AR[PFS]. In step 1110, the size of the output portion of the stack frame is computed and saved in the "size of output" field of the data record (910 in FIG. 9). In an optional step 1112, any additional fields in the data record are filled in.

FIG. 12 illustrates the general pattern for storing stacked general register values and NAT collection values within the backing-store memory of an IA-64 based computer system. The RSE stores groups of 63 stacked general registers, such as group 1202, interleaved with 64-bit values representing the accumulation of NAT single-bit registers associated with each of the previously stored group of 63 stacked general registers, such as the NAT collection 1204. The interleaved NAT collection words are independent of the stack frame boundaries within the backing-store memory, illustrated in FIG. 7A-C. Thus, when computing the backing-store-memory location for the start of any particular stack frame, care must be taken to adjust the computation in the event that a NAT collection has been stored within the set of memory locations corresponding to the stack frame.

Figure 13:
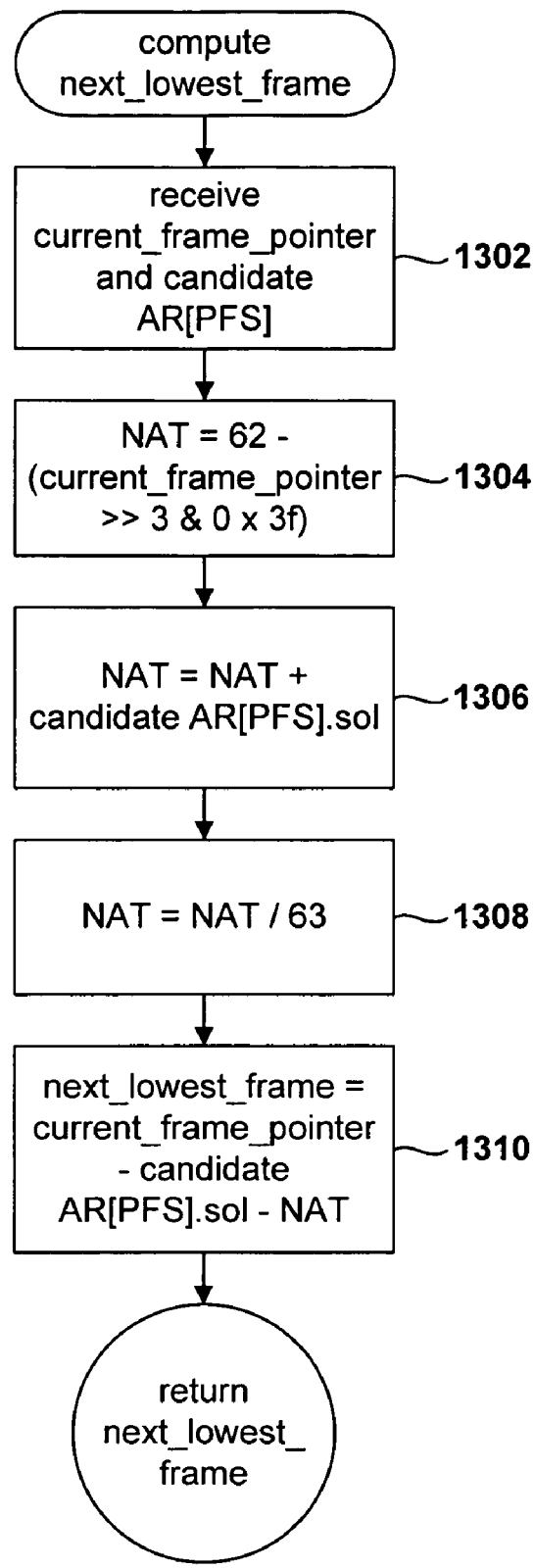
FIG. 13 is a control flow diagram for the routine "compute next_lowest_frame" that represents one embodiment of the present invention.

FIG. 13 is a control flow diagram for the routine "compute next_lowest_frame" that represents one embodiment of the present invention. This routine computes a starting point for the next most recently stacked stack frame in the backing-store memory, given the starting point for the subsequently stored stack frame and a value of the AR[PFS] register associated with the next most recently stacked stack frame. In step 1302, the routine receives a pointer to the currently considered stack frame, current_frame_pointer, and a candidate AR[PFS] value corresponding to the stack frame for which the routine is to compute the starting point. In step 1304, the routine computes the size, in 64-bit memory word units, of the number of memory words between the memory word addressed by current_frame_pointer and the next stored NAT collection, and places that computed value into the variable "NAT." Next, in step 1306, the routine adds the length, in 64-bit memory words, of the local portion of the next most recently stacked stack frame extracted from the AR[PFS] value to the variable "NAT." If the current value stored in the variable "NAT" is less than 63, then the next most recently stacked stack frame can fit into the group of 63 stacked general registers that includes the start of the currently considered stack frame referenced by current_frame_pointer. Otherwise, the next most recently stacked stack frame extends past a stored NAT collection. Thus, in step 1308, the current value and variable "NAT" is divided by 63. The resulting value will either be zero, indicating that no NAT collection has been stored within the next most recently stacked stack frame, or one, indicating that NAT collection has been stored in the most recently stacked stack frame. Finally, in step 1310, the starting word for the next most recently stacked frame is computed and placed into the return variable "next_lowest_frame" by subtracting the extracted size of the local portion of the next most recently stacked stack frame from current_frame_pointer and additionally subtracting the value currently stored in the variable "NAT" from the result.

Figure 14:
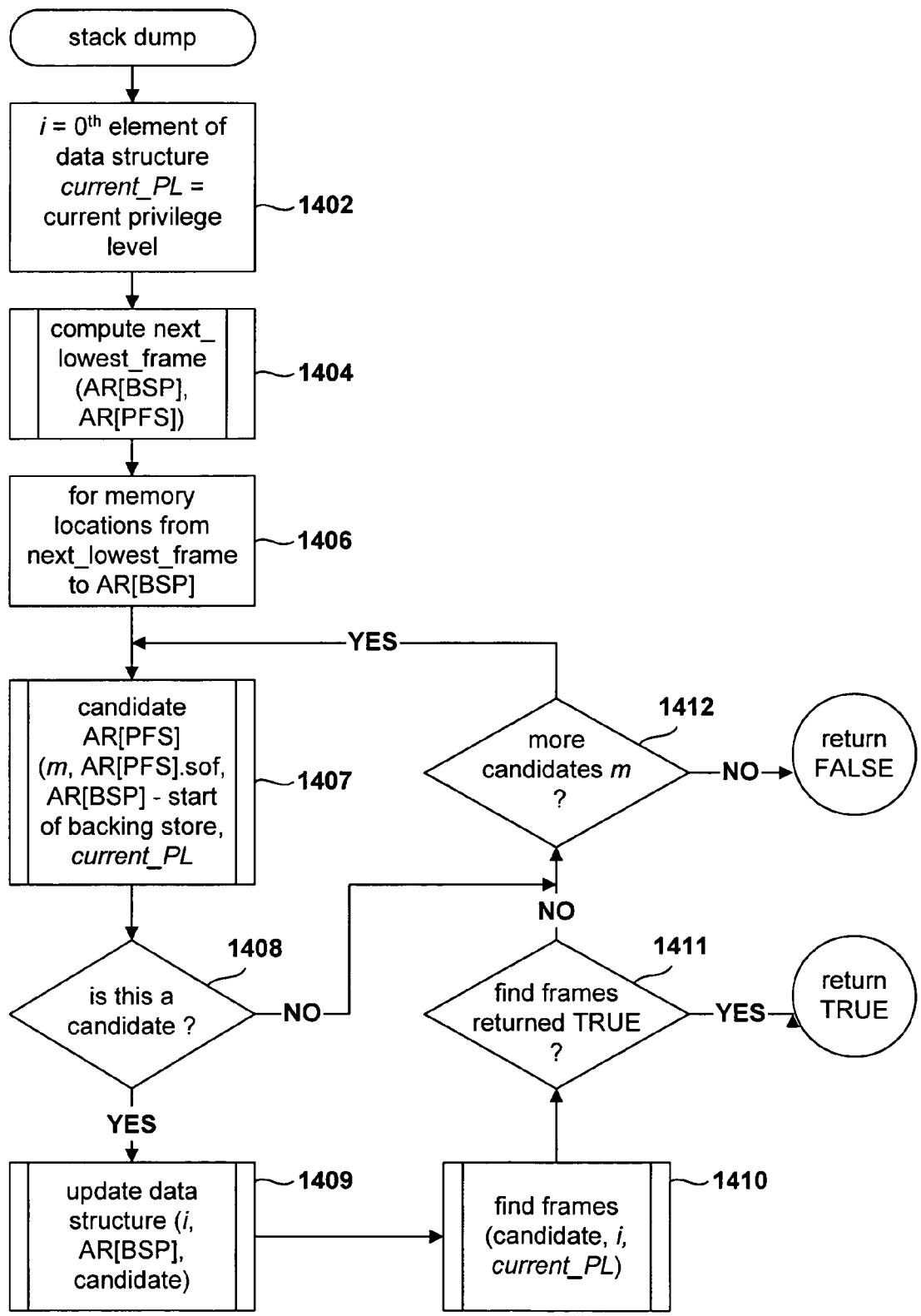
FIG. 14 is a control-flow diagram for the routine "stack dump" that represents one embodiment of the present invention.

FIG. 14 is a control-flow diagram for the routine "stack dump" that represents one embodiment of the present invention. This routine determines the first stacked stack frame in the backing-store memory, initializes the data structure shown in FIG. 10, and then calls the recursive routine "find frames," discussed with reference to FIG. 15, below, to fill in the rest of the records in the data structure to reflect all frames stacked within backing-store memory.

In step 1402, the routine "stack dump" sets the index variable i to index the first data record of a data structure shown in FIG. 10. Next, in step 1404, the routine "stack dump" calls the routine "compute next_lowest_frame" to compute the first location of the most recently stacked stack frame in the backing-store memory, supplying to the routine "compute next_lowest_frame," as arguments, the current contents of the AR[BSP] and AR[PFS] registers. Next, in a for-loop comprising steps 1406-1412, the routine "stack dump" evaluates each stored memory value within the next most recently stacked stack frame in order to identify a memory value that may store the contents of the AR[PFS] register at the time that the routine associated with the next most recently stacked frame began executing. When a candidate stored AR[PFS] value is found, via a call to the routine "candidate AR[PFS]" in step 1407, the candidate AR[PFS] value is used, along with the current contents of AR[BSP], to update the first record in the data structure shown in FIG. 10 via a call to "update date structure" in step 1409. Then, the recursive routine "find frames" is called, in step 1410, to finish dissecting the contents of the backing-store memory in order to reconstruct the frames stacked into the backing-store memory. If the call to the routine "find frames" returns the value TRUE, as determined in step 1411, then the routine "stack dump" successfully completes by returning the value TRUE. Otherwise, if there are more memory locations within the next most recently stacked frame, as determined in step 1412, thefor-loop of steps 1406-1412 again iterates in order to find and try another candidate stored AR[PFS] value. When the quality of the heuristic tests employed by the routine candidate AR[PFS] is high, the recursive analysis of the backing-store memory is most efficient, involving few dead-end recursions ending in a mismatch between assumed stack frame boundaries and the start of the backing-store memory.

Figure 15:
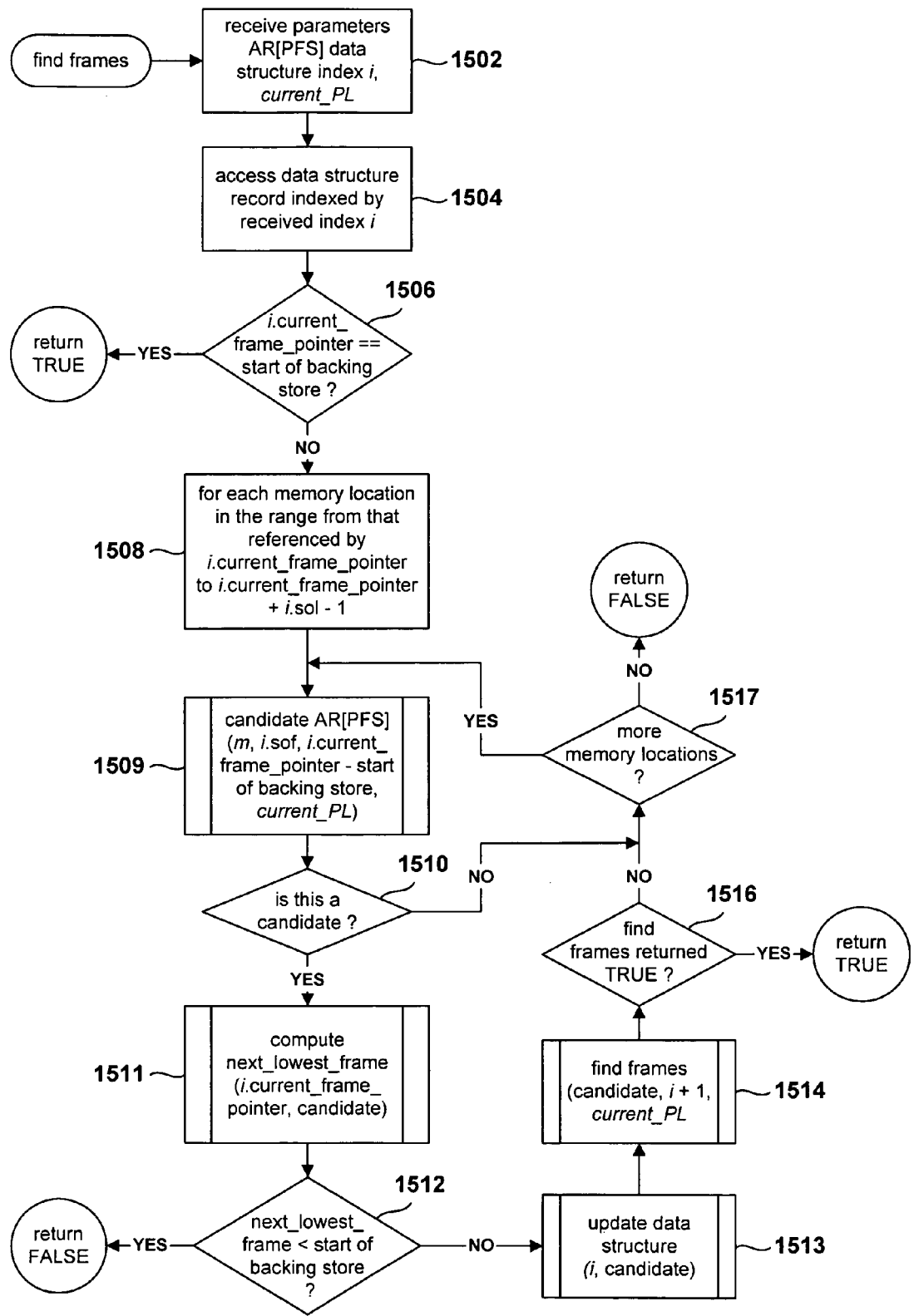
FIG. 15 is a flow-control diagram for the recursive routine "find frames" called in step 1410 of FIG. 14 that represents one embodiment of the present invention.

FIG. 15 is a flow-control diagram for the recursive routine "find frames" called in step 1410 of FIG. 14 that represents one embodiment of the present invention. In step 1502, the routine "find frames" receives a candidate stored AR[PFS] value, the index of a record in a data structure containing the most recently determined stack frame in the backing-store memory, and a current privilege level. Next, in step 1504, the routine "find frames" accesses the data record indexed by the receive index i. In step 1506, the routine "find frames" determines whether or not the pointer to the beginning of the most recently identified stack frame equals the location of the start of the backing-store memory. If so, then the routine "find frames" returns a value TRUE, as all stack frames have been identified and information about the stack frames stored in the data structure shown in FIG. 10. Otherwise, in the for-loop of steps 1508-1517, the routine "find frames" examines each memory location within the most recently identified stack frame to identify candidate stored AR[PFS] values, via a call to the routine "candidate AR[PFS]" in step 1509. When a candidate is found, a next lowest frame starting point is identified via a call to "compute next-lowest frame" in step 1511. If the computed next_lowest_frame value is less than the start of the backing-store memory, as determined in step 1512, then the routine "find frames" returns the value FALSE. Otherwise, the routine "find frames" enters information for the putative next most recently stacked stack frame beginning with the value stored in next_lowest_frame into the data structure shown in FIG. 10 via a call to "update data structure" in step 1513, and then recursively calls the routine "find frames" to continue dissecting the remaining portion of the backing-store memory. If the recursive call to the routine "find frames" returns TRUE, as determined in step 1516, then the current instance of the routine "find frames" also returns TRUE. Otherwise, if more memory locations reside in the currently considered stack frame, as determined in step 1517, then thefor-loop of steps 1508-1517 again iterates to attempt to find a different candidate stored AR[PFS] value from which to again attempt to determine remaining stack frames within the backing-store memory.

Although the present invention has been described in terms of a particular embodiment, it is not intended that the invention be limited to this embodiment. Modifications within the spirit of the invention will be apparent to those skilled in the art. For example, in a simpler version of the backing-store-memory analysis routine described above, a simple iterative routine, rather than the more complex recursive routine, is employed, along with very good stored-AR [PFS]-value detection heuristics, to exactly traverse the backing-store memory by precisely identifying the stored AR[PFS] value in each successively identified stack frame. In more complex implementations, rather than returning a Boolean value, the heuristic routine "compute AR[PFS]" may return a value indicating the likelihood that a particular memory location stores an AR[PFS] value. The candidates within a stack frame can then be ordered based on likelihood to improve efficiency of a recursive or iterative dissection of the backing-store memory. As discussed above, many different types of heuristic tests may be employed to determine whether or not a stored memory value is a stored AR[PFS] value. Certain of the tests are specific to particular computer systems, programming standards, and software design methodologies, while other heuristics are more general in nature. While the described backing-store-memory analysis routine stores a description of the stack frames identified in the backing-store memory in a stack-like data structure, other implementations may simply display the identified stack frames, without storing information that identifies them. The above-described techniques apply specifically to the Intel itanium architecture, but similar techniques can be employed to unravel the stack frames within a backing-store memory used for automatically spilling and reloading registers.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

The invention claimed is:

1. A method for reconstructing the stack frames of nested routines within a computer system from the contents of backing-store memory, the method comprising:
    using a backing-store-pointer register and a previous-stack-frame register to compute the memory location corresponding to the first stored register for the most recently stored stack frame;
    considering the most recently stored stack frame to be the most recently recognized stack frame;
    until all stack frames stored in the backing-store memory have been identified,
        determining a memory location within the most recently recognized stack frame that contains a stored value of the previous-stack-frame register;
        using a memory location comprising the first memory location of the most recently recognized stack frame and the stored value of the previous-stack-frame register in the determined memory location within the most recently recognized stack frame to compute a starting location for a next most recently stored stack frame; and
        considering the next most recently stored stack frame to be the currently recognized stack frame.

2. The method of claim 1 wherein determining a memory location within the most recently recognized stack frame that contains a stored value of the previous-stack-frame register further includes:
    evaluating the contents of memory locations in the most recently recognized stack frame as a candidate stored value of the previous-stack-frame register.

3. The method of claim 2 wherein evaluating the contents of the memory locations in the most recently recognized stack frame as a candidate stored value of the previous-stack-frame register further includes:
    for each of the memory locations,
        applying a number of heuristic tests to the contents of the memory location; and
        when all heuristic tests indicate the contents of the memory location is likely to be the stored value of the previous-stack-frame register, considering the memory location to contain a candidate contents of the previous-stack-frame register.

4. The method of claim 3 wherein, when more than one memory location in the most recently recognized stack frame is a candidate stored value of the previous-stack-frame register, selecting a most likely candidate contents of the previous-stack-frame register.

5. The method of claim 3 wherein, when more than one memory location in the most recently recognized stack frame contains a candidate stored value of the previous-stack-frame register, recursively reconstructing remaining stack frames of nested routines within a computer system from the contents of backing-store memory based on each of the candidate stored value of the previous-stack-frame register, selecting that candidate stored value of the previous-stack-frame register that leads to reconstructing a first stored stack frame that coincides with a beginning location of backing-store memory.

6. The method of claim 3 wherein the heuristic tests include one or more of:
- a test that the stack frame characterized by the candidate stored value of the previous-stack-frame register includes at least two registers;
- a test that the stack frame characterized by the candidate stored value of the previous stack-frame register has at least one local register;
- a test that the local and rotating portions of the stack frame characterized by the candidate stored value of the previous-stack-frame register are not larger than, or do not sum to a value larger than, a total size of the stack frame;
- a test that the stack frame characterized by the candidate stored value of the previous-stack-frame register is not larger than a maximum allowed stack frame size;
- a test that the size of the stack frame characterized by the candidate stored value of the previous-stack-frame register is not larger than the space remaining in backing store;
- a test that the stack frame characterized by the candidate stored value of the previous-stack-frame register does not have more output registers than an allowed maximum number of arguments for a routine;
- a test that the stack frame characterized by the candidate stored value of the previous-stack-frame register does not have an imbalance in local to output registers;
- a test that the stack frame characterized by the candidate stored value of the previous-stack-frame register does not have significantly more output registers than the current frame size;
- a test that the stack frame characterized by the candidate stored value of the previous-stack-frame register does not include non-zero reserved fields; and
- a test that the stack frame characterized by the candidate stored value of the previous-stack-frame register was not saved at a privilege level different than the current privilege level.

7. The method of claim 1 implemented as one or more software routines in a development environment that runs of a computer system.

8. Computer instructions that implement the method of claim 1 stored in a computer-readable memory.

9. A method for determining whether a candidate value is likely to be a value corresponding to contents of a previous-stack-frame register, the method comprising:
applying a number of heuristic tests to the candidate value, wherein the heuristic tests include one or more of
- a test that the stack frame characterized by the candidate stored value of the previous-stack-frame register includes at least two registers;
- a test that the stack frame characterized by the candidate stored value of the previous-stack-frame register has at least one local register;
- a test that the local and rotating portions of the stack frame characterized by the candidate stored value of the previous-stack-frame register are not larger than, or do not sum to a value larger than, a total size of the stack frame;
- a test that the stack frame characterized by the candidate stored value of the previous-stack-frame register is not larger than a maximum allowed stack frame size;
- a test that the size of the stack frame characterized by the candidate stored value of the previous-stack-frame register is not larger than the space remaining in backing store;
- a test that the stack frame characterized by the candidate stored value of the previous-stack-frame register does not have more output registers than an allowed maximum number of arguments for a routine;
- a test that the stack frame characterized by the candidate stored value of the previous-stack-frame register does not have an imbalance in local to output registers;
- a test that the stack frame characterized by the candidate stored value of the previous-stack-frame register does not have significantly more output registers than the current frame size;
- a test that the stack frame characterized by the candidate stored value of the previous-stack-frame register does not include non-zero reserved fields; and
- a test that the stack frame characterized by the candidate stored value of the previous-stack-frame register was not saved at a privilege level different than the current privilege level and
when the heuristic tests indicate that the candidate value is likely to be a value corresponding to contents of a previous-stack-frame register, returning an indication that the candidate value is likely to be a value corresponding to contents of a previous-stack-frame register.

10. The method of claim 9 incorporated into one or more routines that determines locations of the nested stack frames stored in backing-store memory by traversing the stored stack frames one-by-one from a most recently stored stack frame to a least recently stored stack frame.

11. The method of claim 10 wherein the one or more routines additionally checks to determine that the least recently stored stack frame begins at the first word of backing store.

12. The method of claim 9 encoded in computer instructions stored in a computer-readable medium.

13. The method of claim 9 included in a development environment that runs on a computer system.

14. A system that reconstructs the stack frames of nested routines within a computer system from the contents of backing-store memory, the system including:
a first-stored stack frame logic component that identifies, using a backing-store-pointer register and a previous-stack-frame register, a backing-store memory location corresponding to a first stored register for a most recently stored stack frame;
a remaining stack frame logic component that
initially considers the most recently stored stack frame to be the most recently recognized stack frame; and
until all stack frames stored in the backing-store memory have been identified,
determines a memory location within the most recently recognized stack frame that contains a stored value of the previous-stack-frame register;
uses a memory location comprising the first memory location of the most recently recognized stack frame and the stored value of the previous-stack-frame register in the determined memory location within the most recently recognized stack frame to compute a starting location for a next most recently stored stack frame; and
considering the next most recently stored stack frame to be the currently recognized stack frame.

* * * * *

UNITED STATES PATENT AND TRADEMARK OFFICE
CERTIFICATE OF CORRECTION

PATENT NO. : 7,290,176 B2  
APPLICATION NO. : 10/909801  
DATED : October 30, 2007  
INVENTOR(S) : Robert D. Gardner It is certified that error appears in the above-identified patent and that said Letters Patent is hereby corrected as shown below:

In column 10, line 53, delete "GR7" and insert -- $GR_{87}$ --, therefor.

In column 18, line 7 after "contemplated." insert -- It is intended that the scope of the invention be defined by the following claims and their equivalents: --.

In column 19, line 7, in Claim 6, delete "previous stack-frame" and insert -- previous-stack-frame --, therefor.

In column 20, line 20, in Claim 9, after "level" insert -- ; --.

Signed and Sealed this

Fifth Day of August, 2008

JON W. DUDAS  
*Director of the United States Patent and Trademark Office*